US011878534B2

(12) United States Patent
Maruyama et al.

(10) Patent No.: US 11,878,534 B2
(45) Date of Patent: Jan. 23, 2024

(54) SUPPLY UNIT AND LIQUID EJECTION APPARATUS

(71) Applicant: SEIKO EPSON CORPORATION, Tokyo (JP)

(72) Inventors: Akihiko Maruyama, Matsumoto (JP); Tomoyuki Miyazawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 26 days.

(21) Appl. No.: 17/456,757

(22) Filed: Nov. 29, 2021

(65) Prior Publication Data

US 2022/0169030 A1 Jun. 2, 2022

(30) Foreign Application Priority Data

Nov. 30, 2020 (JP) ................................ 2020-198134

(51) Int. Cl.
*B41J 2/175* (2006.01)

(52) U.S. Cl.
CPC ................................ *B41J 2/17523* (2013.01)

(58) Field of Classification Search
CPC .... B41J 2/17523; B41J 2/175; B41J 2/17509; B41J 2/1752; B41J 2/1753; B41J 2/17546; B41J 2/17556; B41J 2/17566; B41J 2/18; B41J 2/17553
USPC ........................................................ 347/85
See application file for complete search history.

(56) References Cited

U.S. PATENT DOCUMENTS

2003/0025762 A1* 2/2003 Sturgeon ................ B41J 2/1752 347/49
2008/0273046 A1* 11/2008 Ishinaga .............. B41J 2/17596 347/6
2013/0182053 A1 7/2013 Kodama et al.
2015/0266304 A1* 9/2015 Kobayashi ........... B41J 2/17523 347/86

FOREIGN PATENT DOCUMENTS

JP 2005-161645 A 6/2005
JP 2013-141802 A 7/2013

* cited by examiner

*Primary Examiner* — Matthew Luu
*Assistant Examiner* — Alexander D Shenderov
(74) *Attorney, Agent, or Firm* — WORKMAN NYDEGGER

(57) ABSTRACT

A supply unit configured to which a liquid container is detachably attached includes a support member that extends along a guiding route crossing a vertical line and that includes a distal region in which a starting end of the guiding route is positioned and a proximal region in which a termination end of the guiding route is positioned, a pivot shaft that is arranged in the proximal region and that has an axis crossing both the vertical line and guiding route, and a liquid inlet that is arranged below the support member and that is configured to be coupled to the liquid container.

17 Claims, 14 Drawing Sheets

SUPPLY UNIT AND LIQUID EJECTION APPARATUS

The present application is based on, and claims priority from JP Application Serial Number 2020-198134, filed Nov. 30, 2020, the disclosure of which is hereby incorporated by reference herein in its entirety.

BACKGROUND

1. Technical Field

The present disclosure relates to a supply unit and a liquid ejection apparatus.

2. Related Art

JP-A-2005-161645 discloses a main tank, which is an example of a liquid container. The main tank is detachably mounted on a printer, which is an example of a liquid ejection apparatus. An ink in the main tank flows down through a coupling tube extending downward from an ink tank and is supplied into the printer. To this end, the main tank is mounted onto the printer with an operation of moving the main tank from above the printer toward the printer below.

For example, in order to mount a liquid container from above a liquid ejection apparatus, an operator needs to move the liquid container down to a desired position while the operator holding the liquid container above the eye level and watching the mounting position, or without watching the mounting position. Therefore, particularly when the mounting position is out of the eye level of the operator, or when the liquid container is heavy, for example, it may be difficult to attach or detach the liquid container.

SUMMARY

According to an aspect of the present disclosure, a supply unit, to which at least one liquid container storing a liquid is configured to be attached and detached, includes: a support member that extends along a guiding route crossing a vertical line and that includes a distal region in which a starting end of the guiding route is positioned and a proximal region in which a termination end of the guiding route is positioned; a pivot shaft that is arranged in the proximal region and that has an axis crossing both the vertical line and guiding route; and a liquid inlet that is arranged below the support member and that is configured to be coupled to the liquid container, in which the support member is configured to pivot about the pivot shaft between a guiding position in which the at least one liquid container is guided along the guiding route and a coupling position in which the at least one liquid container is coupled to the liquid inlet.

DESCRIPTION OF EXEMPLARY EMBODIMENTS

Figure 1:
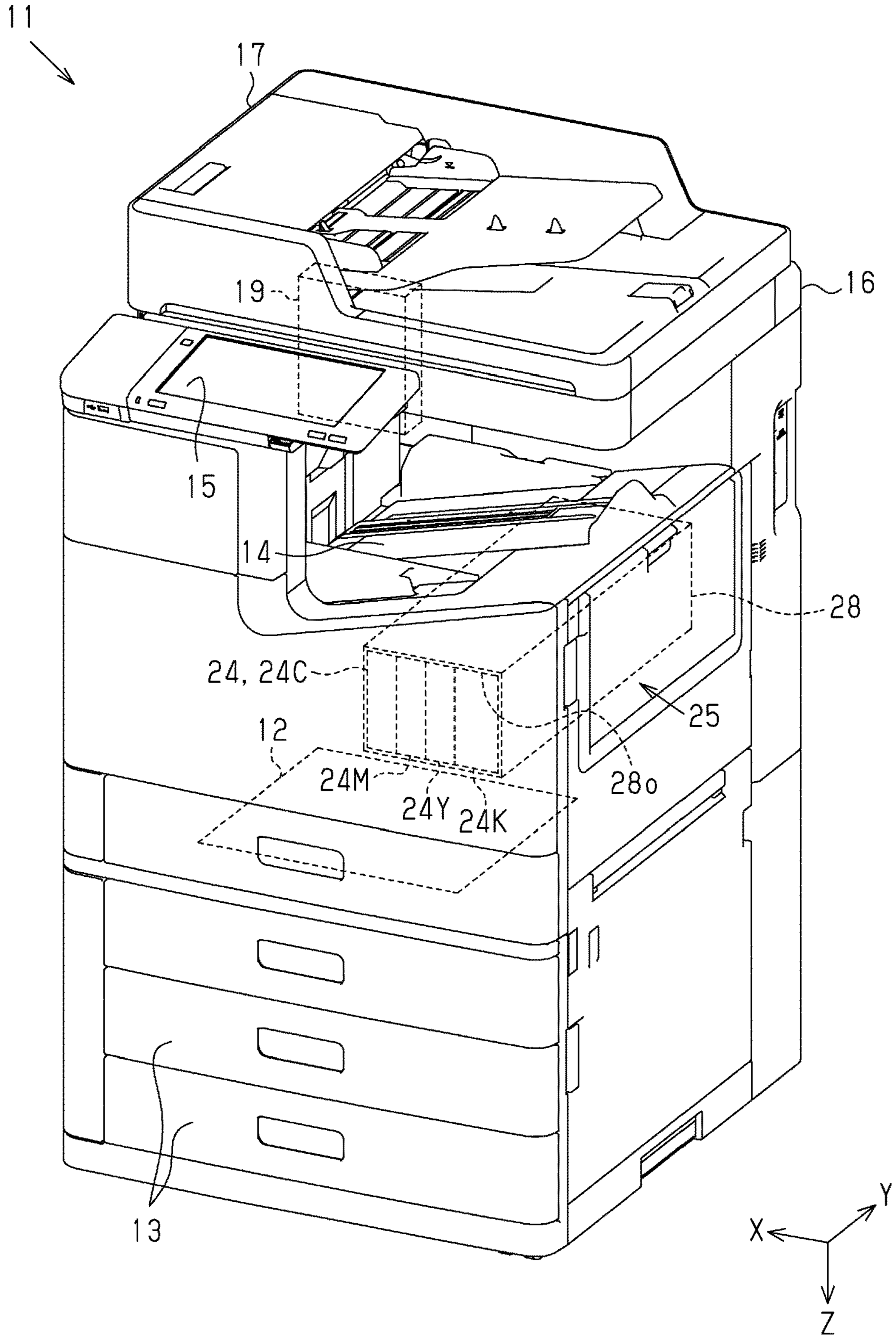
FIG. 1 is a perspective view of a liquid ejection apparatus according to an embodiment.

An embodiment of a supply unit 25 and a liquid ejection apparatus 11 is described below with reference to the drawings. The liquid ejection apparatus 11 is an ink jet type printer that performs printing by ejecting an ink, which is an example of a liquid, onto a medium, such as paper, for example.

In the drawings, assuming that the liquid ejection apparatus 11 is placed on a horizontal plane, a direction of gravitational force is indicated by a Z axis, and directions along the horizontal plane are indicated by an X axis and a Y axis. The X axis, the Y axis, and the Z axis are orthogonal to each other. When a user faces the front of the liquid ejection apparatus 11, the Y axis indicates a depth direction of the liquid ejection apparatus 11, and the X axis indicates a width direction of the liquid ejection apparatus 11.

A. Overall Configuration of Liquid Ejection Apparatus

As illustrated in FIG. 1, the liquid ejection apparatus 11 may include one or more medium storage units 13, a stacker 14, and an operation unit 15. Each medium storage unit 13 is a cassette capable of storing one or more mediums 12, for example. The stacker 14 is arranged to receive the medium 12 on which printing is performed. The operation unit 15 is a touch panel for operating the liquid ejection apparatus 11, for example. The touch panel may be arranged to face the front of the liquid ejection apparatus 11.

The liquid ejection apparatus 11 may include an image reading unit 16 reading an image on copy and an automatic transportation unit 17 transporting the copy to the image reading unit 16. The image reading unit 16 and the automatic transportation unit 17 are arranged above the stacker 14, for example.

The liquid ejection apparatus 11 includes a control unit 19 controlling various operations executed by the liquid ejection apparatus 11. The control unit 19 may be formed as a circuitry including: 1) one or more processors operating according to a computer program (software); 2) one or more dedicated hardware circuits, such as dedicated hardware (application-specific integrated circuitry: ASIC) that executes at least some of various kinds of processing; or 3) a combination of the above. Each processor includes a CPU and a memory, such as a RAM and a ROM, and the memory stores a program code or a command configured to cause the CPU to execute processing. The memory, or a computer-readable medium, may be any available medium that a general-purpose or dedicated computer can access.

The liquid ejection apparatus 11 includes the supply unit 25. The supply unit 25 may include a mounting unit 28 on which one or more liquid containers 24 are detachably mounted. The mounting unit 28 may include multiple slots corresponding to the multiple liquid containers 24, respectively. The mounting unit 28 includes an insertion opening 28*o* into which the liquid containers 24 are inserted. The insertion opening 28*o* opens to the front of the liquid ejection apparatus 11, for example. The liquid ejection apparatus 11 may include a cover (not-illustrated) that covers the insertion opening 28*o*. The cover may be movable between a position in which the insertion opening 28*o* is covered and a position in which the insertion opening 28*o* is opened.

The insertion opening 28*o* is arranged to open to the front of the liquid ejection apparatus 11, for example. In this case, the liquid containers 24 are inserted through the insertion opening 28*o* in a direction along the Y axis from the front of the liquid ejection apparatus 11, for example.

The multiple liquid containers 24 (24C, 24M, 24Y, and 24K) may store different types of multiple liquids, which are inks of different colors, for example, respectively. For example, the liquid containers 24C, 24M, 24Y, and 24K store inks of cyan, magenta, yellow, and black, respectively. The multiple liquid containers 24 may store different amounts of liquids from each other. For example, the liquid container 24K storing a black ink may store greater amount of liquid than that of the other liquid containers 24C, 24M, and 24Y. The liquid container 24K may have a longer width, or a length along the X axis, than that of the other liquid containers 24C, 24M, and 24Y.

B. Configuration of Liquid Container

Figure 2:
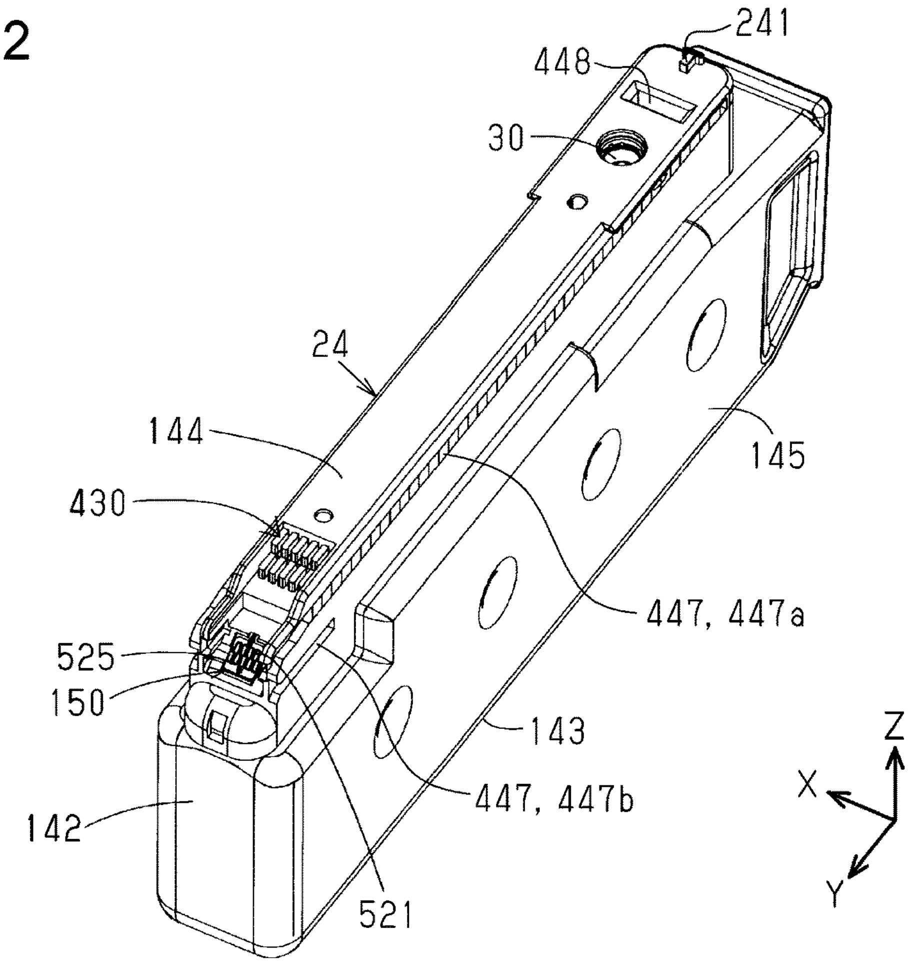
FIG. 2 is a perspective view of a liquid container according to the embodiment.
Figure 3:
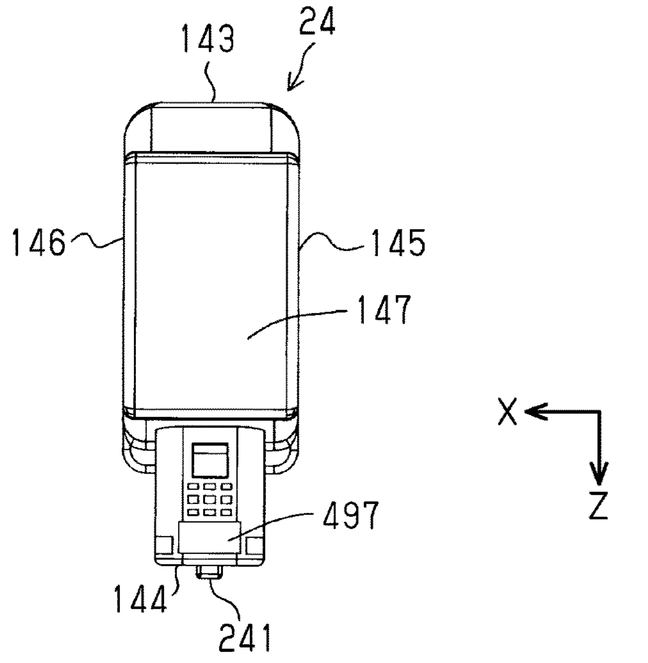
FIG. 3 is a rear view of the liquid container in FIG. 2.

As illustrated in FIGS. 2 and 3, the liquid container 24 is a cartridge including a first end wall 142, an upper wall 143, a bottom wall 144, a first side wall 145, a second side wall 146, and a second end wall 147, for example. When the liquid container 24 is mounted on the liquid ejection apparatus 11, the first end wall 142 is inserted first.

As illustrated in FIG. 2, the liquid container 24 may include an identification unit 430 identifying the type of the liquid container 24 in the bottom wall 144. The identification unit 430 may be multiple projections aligned in the width direction, for example.

The liquid container 24 may include a positioning hole 448 in the bottom wall 144. The positioning hole 448 may be a recess opening at the bottom wall 144. The liquid container 24 may include an outlet 30 opening at the bottom wall 144. The liquid stored in the liquid container 24 flows out from the liquid container 24 through the outlet 30. The liquid container 24 may include a release unit 241 projecting downward from the bottom wall 144. The release unit 241, the positioning hole 448, and the outlet 30 may be aligned in this order from the second end wall 147 toward the first end wall 142.

As illustrated in FIG. 2, the liquid container 24 may include a circuit substrate 150 in a portion in which a corner at which the bottom wall 144 and the first end wall 142 cross each other is cut out. The circuit substrate 150 may include a coupling terminal 521 and a storage medium 525. The storage medium 525 may store information on the liquid container 24, which is information on the liquid stored in the liquid container 24, for example.

The liquid container 24 may include two reception units 447 extending along the Y axis on the first side wall 145 and the second side wall 146, respectively. The reception unit 447 may include a first reception unit 447*a* and a second reception unit 447*b* of different heights on each of the side walls 145 and 146. The first reception unit 447*a* may be a groove extending along the bottom wall 144. The second reception unit 447*b* may be in a position higher than that of the first reception unit 447*a*, and the length along the Y axis is shorter than that of the first reception unit 447*a*. The second reception unit 447*b* may be arranged near the circuit substrate 150.

As illustrated in FIG. 3, the liquid container 24 includes an engagement unit 497 on the second end wall 147. The engagement unit 497 is a recess that is arranged above the release unit 241 and that opens at the second end wall 147, for example. The engagement unit 497 may be arranged in the center of the second end wall 147 in the width direction.

C. Configuration of Mounting Unit

Figure 4:
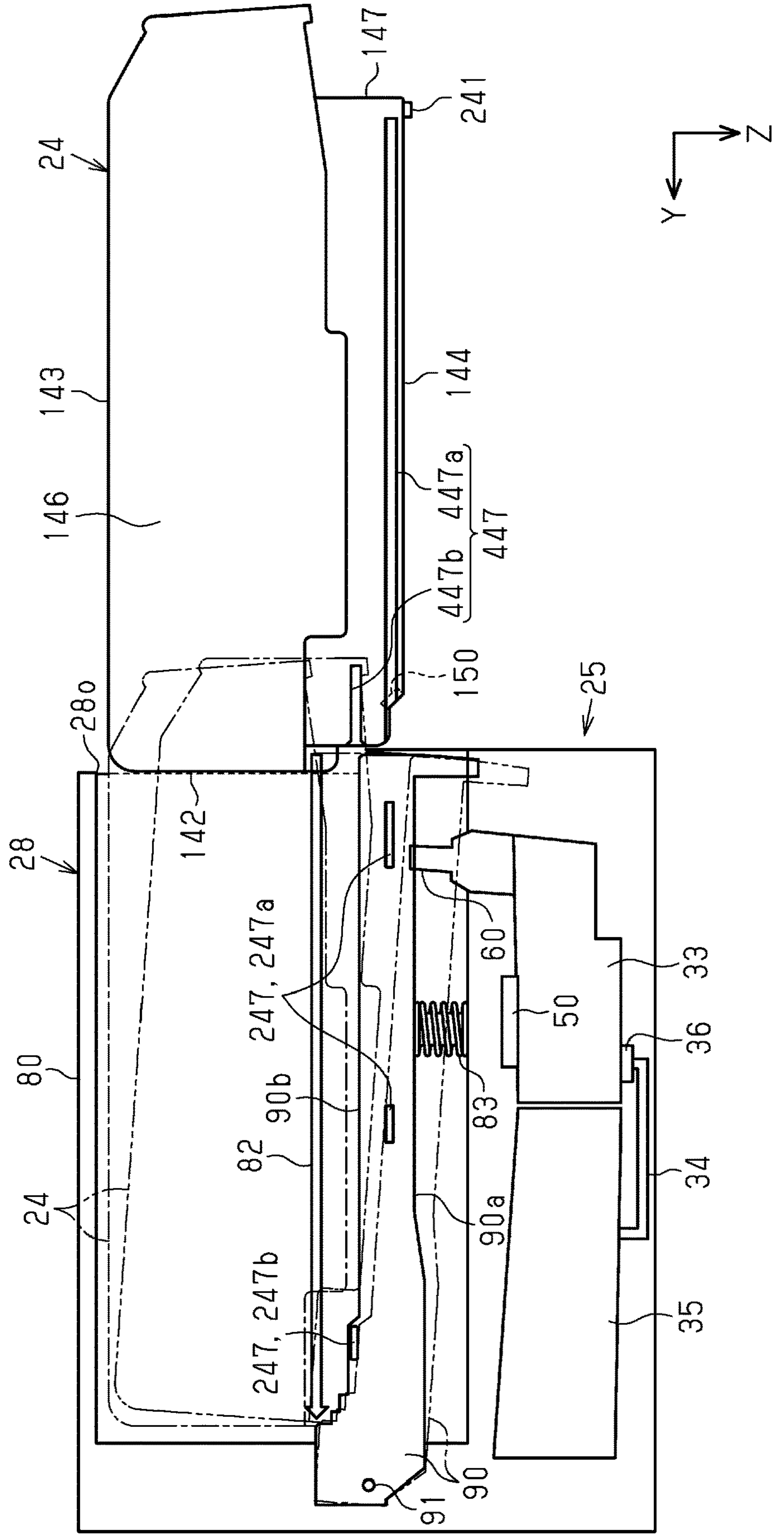
FIG. 4 is a schematic view of a supply unit according to the embodiment.

As illustrated in FIG. 4, the mounting unit 28 includes a frame 80 in a box shape, a support member 90, a pivot shaft 91, and a liquid inlet 60. The support member 90, the pivot shaft 91, and the liquid inlet 60 are arranged in the frame 80. The liquid container 24 is inserted in the frame 80 through the insertion opening 28*o* and moved deeper into the frame 80. The moving direction of the liquid container 24 in this process, or the insertion direction into the mounting unit 28, is along the Y axis.

The support member 90 extends along a guiding route 82 (indicated by a blank arrow in FIG. 4) in the form of a straight line crossing a vertical line (Z axis). The guiding route 82 extends along the moving direction (Y axis). The support member 90 includes a distal region in which a starting end of the guiding route 82 is positioned and a proximal region in which a termination end of the guiding route 82 is positioned. The proximal region of the support member 90 and the pivot shaft 91 are arranged deep in the frame 80, or in a position away from the insertion opening 28*o*. The support member 90 may include a bottom plate 90*a* and two side ribs 90*b*. The two side ribs 90*b* are arranged on two ends of the bottom plate 90*a* in the width direction, respectively.

The pivot shaft 91 has an axis crossing both the vertical line (Z axis) and guiding route 82 (Y axis) and is arranged in the proximal region of the support member 90. The axis of the pivot shaft 91 extends along the X axis. The support member 90 is configured to pivot about the pivot shaft 91 between a guiding position (indicated by a dashed-dotted line in FIG. 4) in which the liquid container 24 is guided along the guiding route 82 and a coupling position (indicated by a dashed-two dotted line in FIG. 4) in which the liquid container 24 is coupled to the liquid inlet 60.

The liquid inlet 60 is arranged below the support member 90. When the support member 90 is arranged in the coupling position, the liquid inlet 60 is coupled to the liquid container 24. The liquid inlet 60 may be arranged in an orientation inclined to the guiding route 82 (horizontally). More specifically, the liquid inlet 60 may be inclined such that a distal end (upper end) thereof is arranged closer to the insertion opening 28*o* than a proximal end (lower end) thereof is. For example, in the liquid inlet 60, the center line may be at an angle in a range greater than 0° and equal to or smaller than 15° to the vertical line (Z axis).

The support member 90 may include one or more guiding units 247 guiding the movement of the liquid container 24. The guiding units 247 may be a pair of guide rails arranged on the paired side ribs 90*b* or may be a single guide rail arranged on the bottom plate 90*a*, for example.

The guiding unit 247 may include a first guiding unit 247*a* and a second guiding unit 247*b* arranged to be engaged with the first reception unit 447*a* and the second reception unit 447*b*, respectively. The guiding units 247*a* and 247*b* may be projections extending in a longitudinal direction of the support member 90, for example. The second guiding unit 247*b* is in a position higher than that of the first guiding unit 247*a*, and the length along the longitudinal direction is shorter than that of first guiding unit 247*a*. The second guiding unit 247*b* may be arranged closer to the pivot shaft 91 than the first guiding unit 247*a* is. The first guiding unit 247*a* may be arranged in a position corresponding to the liquid inlet 60 in the moving direction of the liquid container 24 (see FIG. 7).

The mounting unit 28 may include a first pressing member 83 pressing the support member 90 from the coupling position toward the guiding position. The first pressing member 83 is a coil spring, for example. In an initial state where the liquid container 24 is outside the mounting unit 28, the support member 90 is pressed to the first pressing member 83 and arranged in the guiding position.

Figure 5:
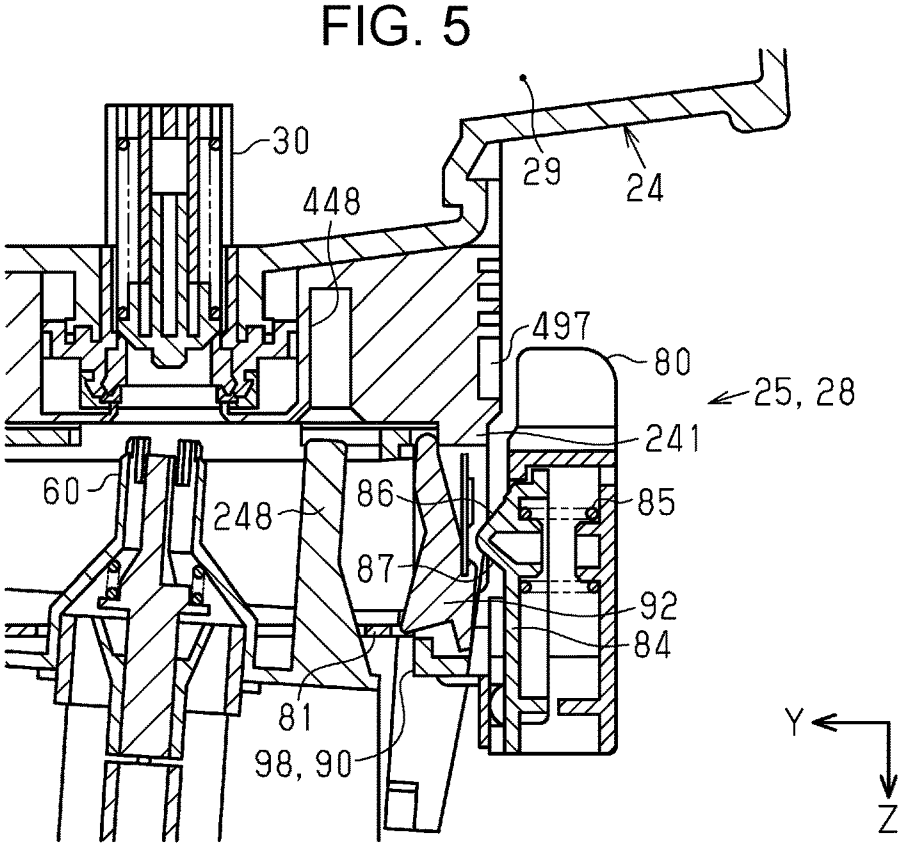
FIG. 5 is a sectional view illustrating a distal region of a support member when the liquid container is inserted in the supply unit in FIG. 4.

As illustrated in FIG. 5, the mounting unit 28 may include a positioning projection 248 projecting upward near the liquid inlet 60. The liquid container 24 may be positioned with the positioning hole 448 being engaged with the positioning projection 248. The positioning projection 248 may be inclined at an angle same as that of the liquid inlet 60. In the bottom plate 90*a*, a portion above the positioning projection 248 and the liquid inlet 60 is cut out (see FIG. 7).

Figure 6:
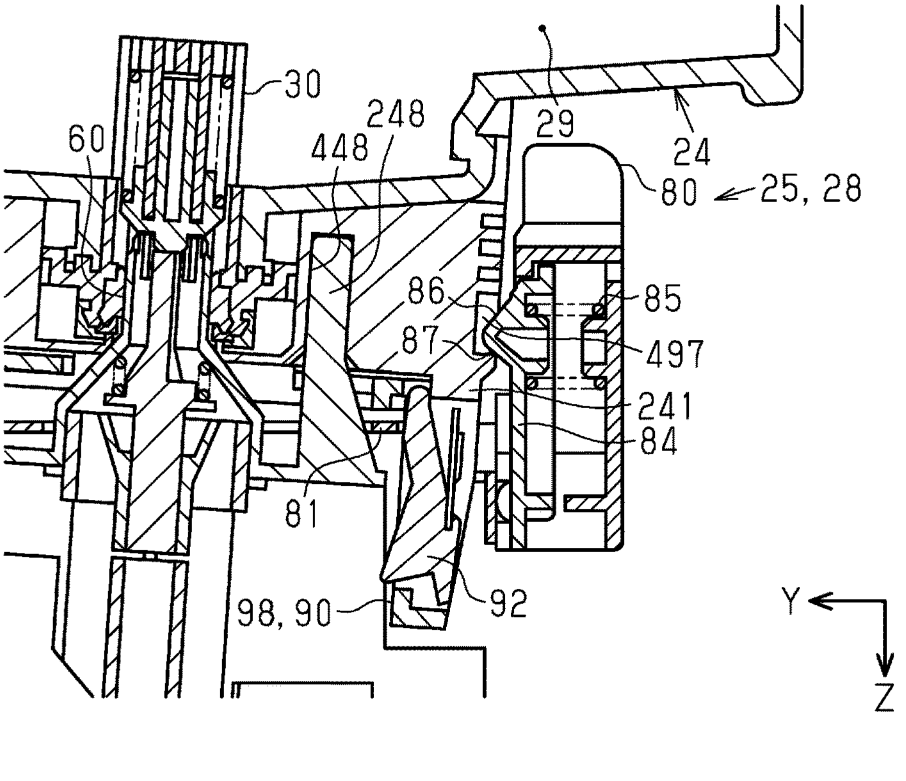
FIG. 6 is a sectional view illustrating that the support member in FIG. 5 is arranged in a coupling position.

As illustrated in FIGS. 5 and 6, the mounting unit 28 may include an engagement lever 84 arranged to face the distal end of the support member 90. The engagement lever 84, the positioning projection 248, and the liquid inlet 60 may be aligned in this order along the Y axis. The engagement lever 84 may include a proximal end (lower end) fixed to the frame 80 and a distal end (upper end). The mounting unit 28 may include a second pressing member 85 pressing the distal end of the engagement lever 84 toward the support member 90.

The engagement lever 84 is arranged to be engaged with the liquid container 24 supported by the support member 90 when the support member 90 is in the coupling position. The engagement lever 84 may include a first inclined surface 86 extending obliquely downward from the distal end and a second inclined surface 87 extending obliquely downward from a lower end of the first inclined surface 86. The first inclined surface 86 and the second inclined surface 87 define a protrusion projecting toward the support member 90.

The first inclined surface 86 is engaged with the liquid container 24 when the support member 90 pivots along a pivoting route from the guiding position (position illustrated in FIG. 5) to the coupling position (position illustrated in FIG. 6). The second inclined surface 87 is engaged with the liquid container 24 when the support member 90 is in the coupling position and when the support member 90 pivots from the coupling position toward the guiding position.

Figure 7:
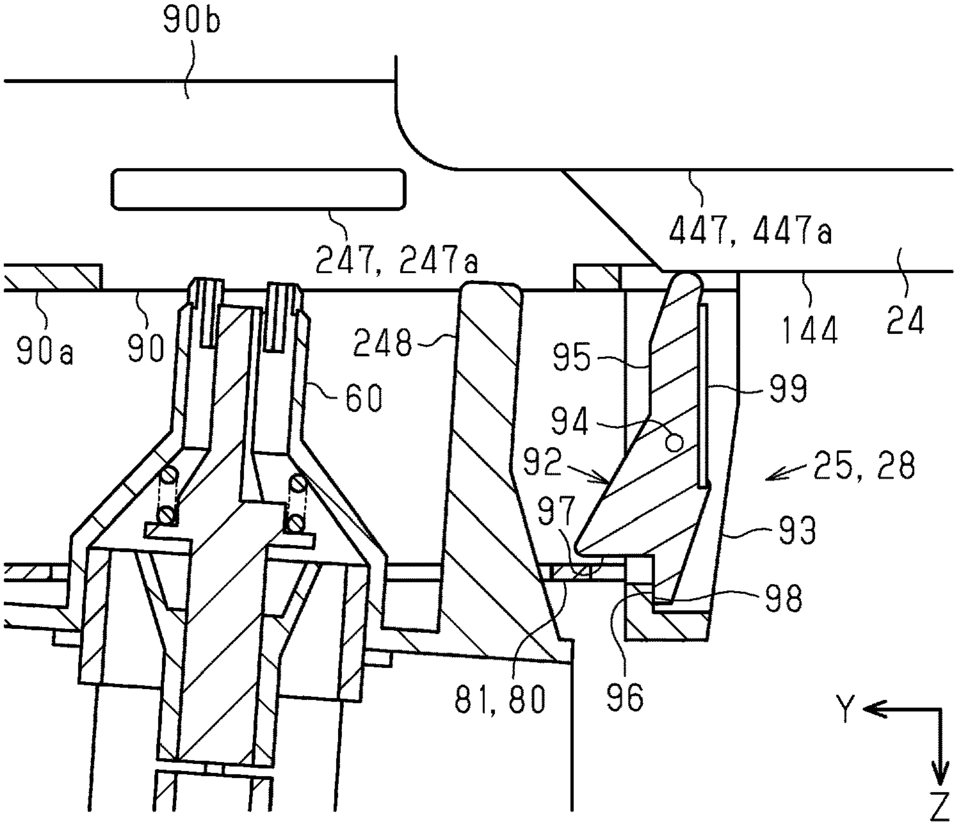
FIG. 7 is a schematic view illustrating the distal region of the support member when the liquid container in FIG. 4 is near a starting end of a guiding route.
Figure 8:
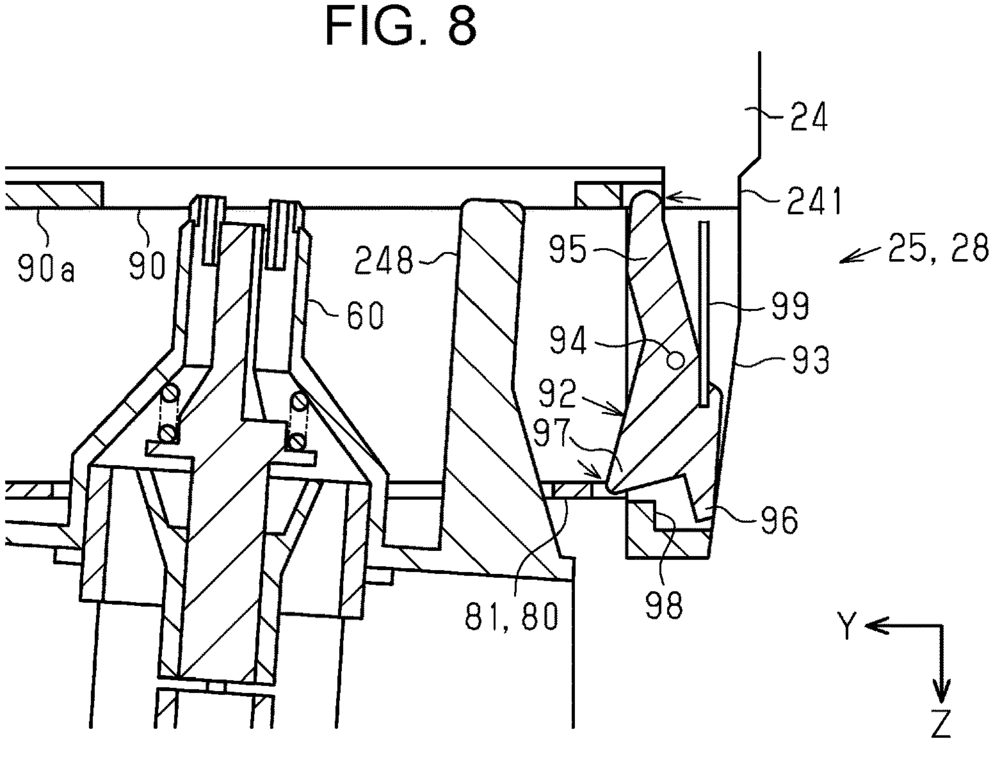
FIG. 8 is a schematic view illustrating the distal region of the support member when the liquid container in FIG. 7 reaches a termination end of the guiding route.

As illustrated in FIGS. 7 and 8, the mounting unit 28 may include a locking lever 92 that can be displaced between a locking position (position illustrated in FIG. 7) in which the pivoting of the support member 90 is limited and a releasing position (position illustrated in FIG. 8) in which the pivoting of the support member 90 is allowed. The locking lever 92 may be arranged between the engagement lever 84 (see FIG. 5) and the positioning projection 248 in the moving direction of the liquid container 24, for example. The locking lever 92 is configured to be displaced from the locking position to the releasing position by being engaged with the release unit 241 when the liquid container 24 reaches the termination end of the guiding route 82.

The support member 90 includes an extending portion 93 extending downward from the distal end of the support member 90. The extending portion 93 includes a stopper 98 extending in the width direction on a distal end thereof. The locking lever 92 is supported by the extending portion 93 pivotally about a shaft 94.

The locking lever 92 includes a first arm 95 extending upward from the shaft 94, a second arm 96 extending downward from the shaft 94, and a third arm 97 extending obliquely downward from the shaft 94. The third arm 97 is arranged deeper in the mounting unit 28 than the second arm 96 is. The mounting unit 28 may include a third pressing member 99 pressing a distal end of the first arm 95 toward the outside of the mounting unit 28. The third pressing member 99 is a leaf spring, for example.

The frame 80 includes a locking bar 81 extending in the width direction deeper in the mounting unit 28 than the third arm 97 is. In the locking position illustrated in FIG. 7, the first arm 95 pressed by the third pressing member 99 is pressed in the clockwise direction about the shaft 94 in FIG. 7; however, with the second arm 96 being in contact with the stopper 98, further pivoting is limited. In this process, the locking bar 81 is directly below the third arm 97. In the locking position, there may be a slight distance between a lower end of the third arm 97 and the locking bar 81.

When the distal end (first end wall 142) of the liquid container 24 is inserted into the mounting unit 28, the locking lever 92 is in the locking position. For instance, if the liquid container 24 that enters the inside of the frame 80 is inclined downward in the front direction, the liquid container 24 collides with the bottom plate 90*a*. With this, when the support member 90 holding the locking lever 92 tries to pivot downward, the third arm 97 is in contact with the locking bar 81. Therefore, the pivoting of the support member 90 is limited. Consequently, it is possible to avoid the liquid container 24 from being inclined downward in the front direction in the middle of the guiding route and from being in contact with the liquid inlet 60.

As illustrated in FIG. 8, when the liquid container 24 reaches the termination end of the moving route, the release unit 241 pushes the first arm 95 in the moving direction. Then, the locking lever 92 pivots against the pressing force of the third pressing member 99 in the counterclockwise direction as indicated by an arrow in FIG. 8. Therefore, the engagement of the third arm 97 with the locking bar 81 is released. In this process, the locking bar 81 is not positioned directly below the third arm 97. Therefore, the support member 90 is allowed to pivot to the coupling position with the locking lever 92.

Figure 9:
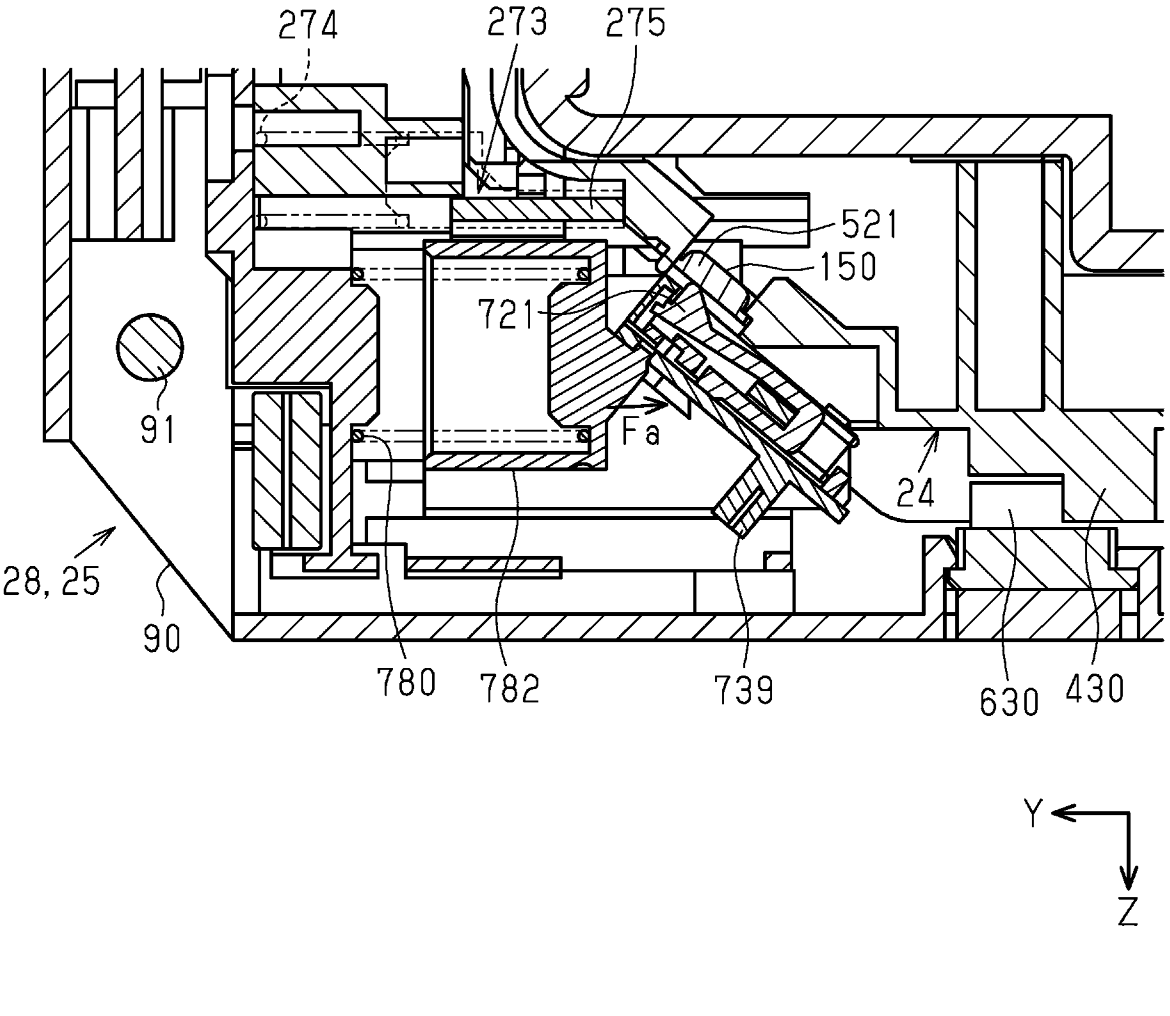
FIG. 9 is a sectional view illustrating a proximal region of the support member in FIG. 4.

As illustrated in FIG. 9, the support member 90 may include one or more electrical coupling units 721 and a connector 739 in the proximal region. The one or more electrical coupling units 721 are configured to be electrically coupled to the coupling terminal 521 of the liquid container 24. The electrical coupling unit 721 is a plate made of metal, for example, and includes a distal end projecting toward the liquid container 24. The electrical coupling unit 721 may be elastically deformed when receiving external force by the distal end. The connector 739 is electrically coupled to the one or more electrical coupling units 721. The connector 739 is electrically coupled to the control unit 19 (see FIG. 1) of the liquid ejection apparatus 11 through wiring (not-illustrated).

The mounting unit 28 may include a holding member 782 holding the electrical coupling units 721 and the connector 739 and a press spring 780. The press spring 780 may include a first end (left end in FIG. 9) engaged with the support member 90 and a second end (right end in FIG. 9) engaged with the holding member 782.

The support member 90 includes an identification shape 630 corresponding to the identification unit 430 of the liquid container 24. The identification shape 630 may be arranged near the termination end of the guiding route that is, for example, in front of the electrical coupling unit 721. The identification shape 630 is used to identify whether the liquid container 24 is inserted in a proper slot. The identification shape 630 may be a rib having a different shape depending on the type (for example, color) of the liquid stored in the liquid container 24. If a wrong liquid container 24 is inserted, the identification unit 430 is not fitted in the identification shape 630, and thus the wrong insertion is prevented. With this, it is possible to reduce the possibility that the liquid container 24 of a wrong type is mounted.

The mounting unit 28 may include an extrusion mechanism 273. The extrusion mechanism 273 is configured to press the liquid container 24 supported by the support member 90 toward the starting end of the guiding route. The extrusion mechanism 273 includes one or more fourth pressing members 274 and an extrusion member 275, for example. The one or more fourth pressing members 274 may include two fourth pressing members 274 aligned in the width direction, for example. Each fourth pressing member 274 is a coil spring, for example. The fourth pressing member 274 may include a first end (left end in FIG. 9) fixed to the proximal region of the support member 90 and a second end (right end in FIG. 9) fixed to the extrusion member 275. The pressing force of the fourth pressing member 274 may be set so as to move the liquid container 24 along the guiding route until the coupling terminal 521 is decoupled from the electrical coupling unit 721.

As illustrated in FIG. 9, when the liquid container 24 reaches the termination end of the guiding route, the liquid container 24 pushes the extrusion member 275. Once the fourth pressing member 274 is compressed accordingly, the extrusion mechanism 273 presses the liquid container 24 toward the starting end of the guiding route.

When the liquid container 24 reaches the termination end of the guiding route, the coupling terminal 521 of the liquid container 24 pushes the electrical coupling unit 721. Accordingly, the press spring 780 is compressed. The pressing force of the compressed press spring 780 with respect to the liquid container 24 is indicated by Fa. The electrical coupling unit 721 is pushed against the circuit substrate 150 by the pressing force Fa. As a result, an excellent contact between the electrical coupling unit 721 and the coupling terminal 521 is maintained. Additionally, with the elastic deformation of the electrical coupling unit 721 itself, the electrical coupling unit 721 is in contact with the coupling terminal 521 at a proper pressure.

D. Configuration of Supply Unit

As illustrated in FIG. 4, the supply unit 25 may include a first reservoir unit 33 arranged below the support member 90. The liquid inlet 60 projects upward from the first reservoir unit 33. When the liquid inlet 60 is coupled to the liquid container 24, the liquid in the liquid container 24 is introduced into the first reservoir unit 33 through the liquid inlet 60 and is reserved temporarily in the first reservoir unit 33. The supply unit 25 may include an atmosphere opening channel 50 configured to open the inside of the first reservoir unit 33 to the atmosphere. The atmosphere opening channel 50 may be arranged on a top portion of the first reservoir unit 33.

The supply unit 25 may include a second reservoir unit 35 arranged below the support member, a communication channel 34, and a one-way valve 36 capable of closing the communication channel 34. The communication channel 34 includes an upstream end communicating with the first reservoir unit 33 and a downstream end communicating with the second reservoir unit 35. The second reservoir unit 35 communicates with the first reservoir unit 33 through the communication channel 34. The liquid in the first reservoir unit 33 flows into the second reservoir unit 35 through the communication channel 34.

The one-way valve 36 is arranged between the first reservoir unit 33 and the second reservoir unit 35 so as to open and close the communication channel 34. The one-way valve 36 may be arranged between the communication channel 34 and the first reservoir unit 33. The one-way valve 36 may be configured to allow a flow of the liquid from the first reservoir unit 33 to the second reservoir unit 35 but limit a flow of the liquid from the second reservoir unit 35 to the first reservoir unit 33. The one-way valve 36 may be an opening/closing valve that is opened and closed under control.

E. Configurations of Supply Unit and Driving Mechanism

Figure 10:
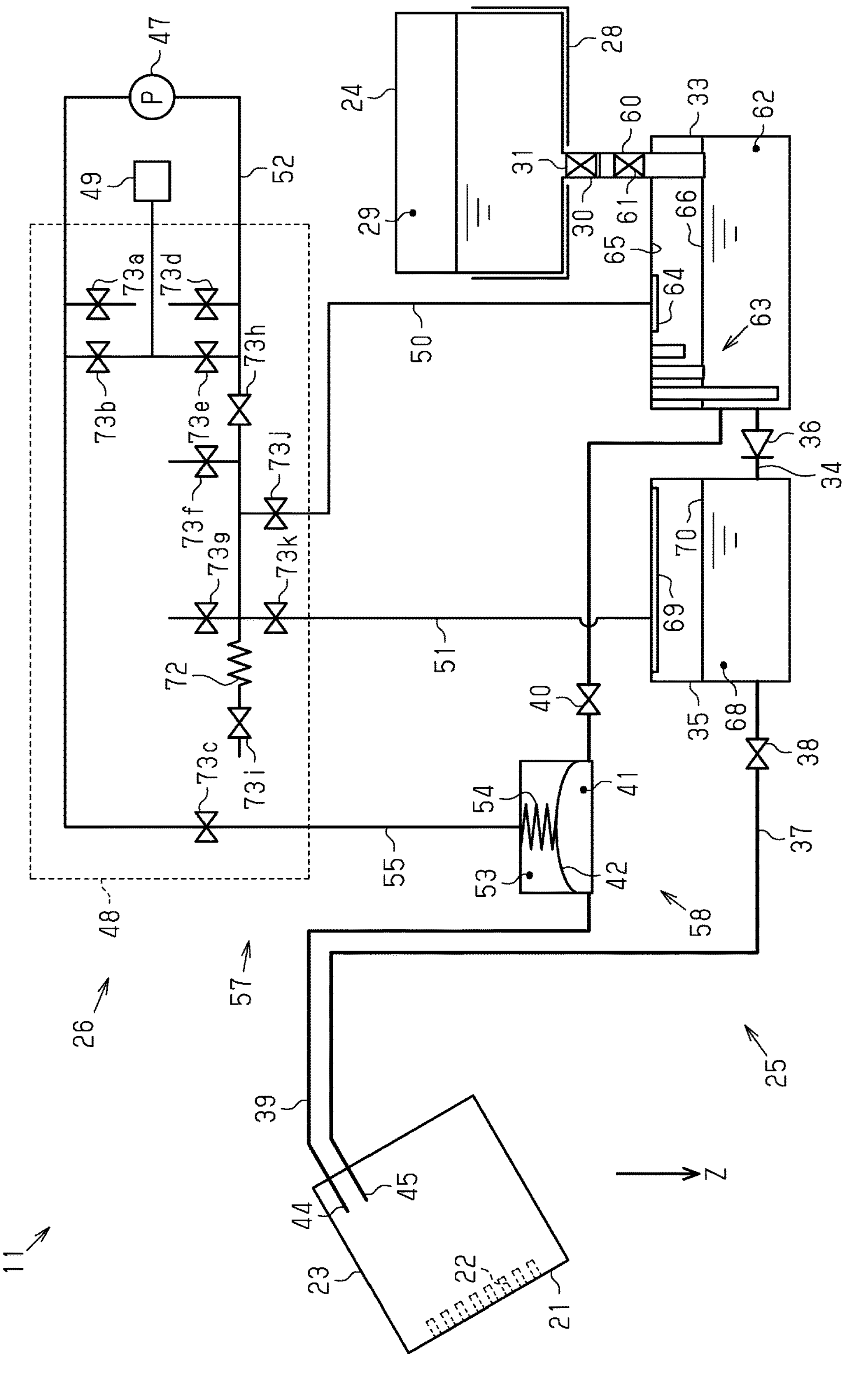
FIG. 10 is a schematic view of the supply unit and a driving mechanism included in the liquid ejection apparatus in FIG. 1.

As illustrated in FIG. 10, the liquid ejection apparatus 11 includes a liquid ejection head 23, a supply flow channel 37 supplying the liquid from the supply unit 25 to the liquid ejection head 23, and a driving mechanism 26 driving the supply unit 25. The liquid ejection head 23 includes one or more nozzles 22 and a nozzle surface 21 at which the nozzles 22 open. The supply unit 25 is configured to supply the liquid stored in the liquid container 24 to the liquid ejection head 23 through the first reservoir unit 33, the communication channel 34, the second reservoir unit 35, and the supply flow channel 37. The liquid ejection head 23 is configured to eject the supplied liquid from the nozzles 22.

If the liquid ejection apparatus 11 includes multiple supply units 25 corresponding to different colors, the liquid ejection apparatus 11 can perform color printing by ejecting multiple colors of inks. A single driving mechanism 26 may drive the multiple supply units 25 together. The liquid ejection apparatus 11 may include multiple driving mechanisms 26 individually driving the multiple supply units 25.

The liquid ejection head 23 may be detachably provided in a main body of the liquid ejection apparatus 11. The liquid ejection head 23 may be arranged such that the nozzle surface 21 has an inclined orientation inclined with respect to the horizontal. The liquid ejection head 23 may execute printing by ejecting the liquid onto the medium 12 in the inclined orientation. The liquid ejection head 23 may be a line type that is provided over the width direction of the medium 12. The liquid ejection head 23 may be a serial type that performs printing while moving in the width direction of the medium 12.

The liquid container 24 may include a storage chamber 29 storing the liquid. The liquid stored in the storage chamber 29 flows out through the outlet 30. The outlet 30 may include an outlet valve 31. The storage chamber 29 is a sealed space not communicating with the atmosphere, for example. The liquid container 24 before being mounted on the mounting unit 28 may store a greater amount of liquid than the amount of the liquid that the supply unit 25 can hold.

The supply unit 25 may include a supply valve 38 capable of closing the supply flow channel 37, a collection flow channel 39, a circulation valve 40 capable of opening and closing the collection flow channel 39, and a liquid chamber 41. The liquid chamber 41 is arranged in the middle of the collection flow channel 39. The collection flow channel 39 includes an upstream end coupled to the liquid ejection head 23 and a downstream end coupled to the first reservoir unit 33. The collection flow channel 39 is a flow channel for flowing the liquid in the liquid ejection head 23 toward the inside of the supply unit 25.

The liquid chamber 41 is arranged in the middle of the collection flow channel 39, or between the liquid ejection head 23 and the circulation valve 40. A part of the liquid chamber 41 is defined by a flexible member 42. With a deflection of the flexible member 42, the volume of the liquid chamber 41 is changed.

The liquid ejection head 23 may include a first coupling unit 44 coupled to the collection flow channel 39 and a second coupling unit 45 coupled to the supply flow channel 37. The collection flow channel 39 includes the upstream end coupled to the first coupling unit 44 and the downstream end coupled to the first reservoir unit 33. The supply flow channel 37 includes an upstream end coupled to the second reservoir unit 35 and a downstream end coupled to the second coupling unit 45. The first coupling unit 44 may be arranged in a position higher than that of the second coupling unit 45 when the liquid ejection head 23 is in the inclined orientation.

The driving mechanism 26 includes a pressurizing unit 47 pressurizing the inside of the second reservoir unit 35. The driving mechanism 26 may include a switching mechanism 48 coupled to the pressurizing unit 47 and a pressure sensor 49 detecting a pressure. The driving mechanism 26 may include an atmosphere opening channel 50 coupled to the first reservoir unit 33, a pressurizing flow channel 51 coupled to the second reservoir unit 35, and a coupling flow channel 52 coupling the atmosphere opening channel 50 and the pressurizing flow channel 51 to the pressurizing unit 47. The driving mechanism 26 may include an air chamber 53 separated from the liquid chamber 41 by the flexible member 42, a spring 54 provided in the air chamber 53, and an air flow channel 55 coupled to the air chamber 53. The spring 54 reduces a pressure variation in the liquid in the collection flow channel 39 and the liquid ejection head 23 by pressing the flexible member 42.

The pressurizing unit 47 is a tube pump including a roller and a tube, for example. In this case, air is sent out with the roller rotating and squashing the tube. A tube (not-illustrated) included in the pressurizing unit 47 includes a first end coupled to the air flow channel 55 and a second end coupled to the coupling flow channel 52. In the normal rotation driving, the pressurizing unit 47 sends out the air taken from the air flow channel 55 to the coupling flow channel 52. In the inverse rotation driving, the pressurizing unit 47 sends out the air taken from the coupling flow channel 52 to the air flow channel 55.

The supply unit 25 may include a pressurizing mechanism 57 configured to pressurize the liquid in the supply flow channel 37. The pressurizing mechanism 57 includes the pressurizing unit 47, the air chamber 53, and the air flow channel 55, for example. The supply unit 25 may include a slight pressurizing unit 58 arranged in the middle of the collection flow channel 39, which is between the liquid ejection head 23 and the circulation valve 40. The slight pressurizing unit 58 includes the pressurizing mechanism 57 and the liquid chamber 41 and is configured to pressurize the liquid in the collection flow channel 39. More specifically, the pressurizing mechanism 57 pressurizes the flexible member 42 from the outside of the liquid chamber 41.

Next, the first reservoir unit 33 is described.

The first reservoir unit 33 may include a liquid inlet 60, a first reservoir chamber 62, a liquid amount sensor 63, and a first gas-liquid separation film 64. The liquid inlet 60 may include an inlet valve 61. The liquid amount sensor 63 detects an amount of the liquid reserved in the first reservoir chamber 62. The first gas-liquid separation film 64 separates the first reservoir chamber 62 and the atmosphere opening channel 50 from each other. The first gas-liquid separation film 64 has properties of allowing a gas to pass therethrough but not allowing a liquid to pass therethrough.

Once the mounting of the liquid container 24 is completed, the outlet valve 31 and the inlet valve 61 are opened. While the liquid container 24 is mounted on the mounting unit 28, the valves 31 and 61 are kept opened. When the liquid container 24 is mounted on the mounting unit 28, the inlet valve 61 may be opened earlier than the outlet valve 31 is. In this way, a liquid is prevented from easily leaking out of the liquid container 24.

The liquid inlet 60 is arranged on a top portion of the first reservoir unit 33. The liquid inlet 60 penetrates through a ceiling 65 of the first reservoir chamber 62, for example. A lower end of the liquid inlet 60 is arranged in the first reservoir chamber 62 and positioned lower than the ceiling 65 is. An upper end of the liquid inlet 60 is arranged outside the first reservoir chamber 62 and positioned higher than the ceiling 65 is.

The lower end of the liquid inlet 60 is positioned lower than the nozzle surface 21 is. Therefore, a first liquid level 66 of the liquid reserved in the first reservoir unit 33 is varied in a range lower than the nozzle surface 21 is. Specifically, the liquid in the liquid container 24 flows into the first reservoir unit 33 through the outlet 30 and the liquid inlet 60 due to the hydraulic head difference with the liquid in the first reservoir unit 33.

In this process, air of an amount corresponding to the amount of the liquid flowed in the first reservoir unit 33 flows and moves from the first reservoir unit 33 to the liquid container 24 through the liquid inlet 60 and the outlet 30. At the same time, the first liquid level 66 is increased by the amount of the liquid flowed therein. When the first liquid level 66 reaches the lower end of the liquid inlet 60, the flow of the air from the first reservoir unit 33 into the liquid container 24 is stopped. Since the storage chamber 29 is sealed, when the flow of the air therein is stopped, the pressure in the storage chamber 29 is reduced by the amount of the liquid flowed therein. When the negative pressure in the storage chamber 29 becomes greater than the hydraulic head of the liquid in the storage chamber 29, the flow of the liquid from the liquid container 24 into the first reservoir unit 33 is stopped.

When the liquid flows and moves from the first reservoir unit 33 to the second reservoir unit 35, the first liquid level 66 is lowered. In this process, the air flows into the storage chamber 29 through the liquid inlet 60 and the outlet 30, and the negative pressure in the storage chamber 29 is reduced.

When the negative pressure in the storage chamber 29 becomes smaller than the hydraulic head of the liquid in the storage chamber 29, the liquid in the liquid container 24 flows into the first reservoir unit 33. As a result, while there is the liquid in the liquid container 24, the first liquid level 66 is maintained in a standard position, which is a position near the lower end of the liquid inlet 60. When the liquid in the liquid container 24 disappears, the first liquid level 66 is lowered below the standard position.

The liquid amount sensor 63 may detect that the first liquid level 66 is positioned in the standard position, the first liquid level 66 is positioned below the standard position, and the first liquid level 66 is positioned in a filled position. The filled position is a position above the standard position. When the first liquid level 66 is positioned in the filled position, the first reservoir unit 33 reserves the maximum amount of the liquid. When the liquid amount sensor 63 detects that the first liquid level 66 is positioned below the standard position, the control unit 19 may determine that the liquid container 24 is empty and instructs the user to replace the liquid container 24.

The standard position is set above the downstream end of the collection flow channel 39 in the first reservoir chamber 62, for example. In this case, when the first liquid level 66 is in the standard position, the liquid in the first reservoir unit 33 can flow and move into the liquid ejection head 23 through the collection flow channel 39.

Next, the second reservoir unit 35 is described.

The second reservoir unit 35 may include a second reservoir chamber 68 and a second gas-liquid separation film 69 separating the second reservoir chamber 68 and the pressurizing flow channel 51 from each other. As with the first gas-liquid separation film 64, the second gas-liquid separation film 69 has the properties of allowing a gas to pass therethrough but not allowing a liquid to pass therethrough.

The liquid in the first reservoir unit 33 flows and moves into the second reservoir unit 35 due to the hydraulic head difference with the liquid in the second reservoir unit 35. When the pressures in the first reservoir chamber 62 and in the second reservoir chamber 68 are atmospheric pressure, a second liquid level 70 of the liquid reserved in the second reservoir unit 35 has the same height as that of the first liquid level 66. In other words, the second liquid level 70 is maintained in the standard position, which has substantially the same height as that of the lower end of the liquid inlet 60, and is varied in a range lower than the nozzle surface 21. The liquid in the liquid ejection head 23 is maintained at a negative pressure due to the hydraulic head difference with the liquid in the first reservoir unit 33 and the liquid in the second reservoir unit 35. When the liquid is consumed in the liquid ejection head 23, the liquid reserved in the second reservoir unit 35 is supplied to the liquid ejection head 23.

The one-way valve 36 closes the communication channel 34 when the pressure in the second reservoir unit 35 is greater than the pressure in the first reservoir unit 33. Therefore, when the pressurizing unit 47 pressurizes the inside of the second reservoir unit 35, the one-way valve 36 blocks the communication channel 34.

The control unit 19 (see FIG. 1) controls the opening/closing operation of the supply valve 38 and the circulation valve 40. The supply valve 38 can open and close the supply flow channel 37 during the pressurizing by the pressurizing unit 47. The circulation valve 40 can open and close the collection flow channel 39.

Next, the switching mechanism 48 is described.

The switching mechanism 48 includes a narrow tube portion 72, which is a part of the coupling flow channel 52, and a first selection valve 73*a* to an eleventh selection valve 73*k*. The narrow tube portion 72 is a tube that is meandering and narrow enough such that the flow and movement of the liquid is considerably limited comparing with the flow and movement of the air.

When the first selection valve 73*a* is opened, the air flow channel 55 communicates with the atmosphere. When the second selection valve 73*b* is opened, the air flow channel 55 communicates with the pressure sensor 49. When the third selection valve 73*c* is opened, the air flow channel 55 is opened, and the pressurizing unit 47 communicates with the air chamber 53.

When the fourth selection valve 73*d* is opened, the coupling flow channel 52 between the pressurizing unit 47 and the eighth selection valve 73*h* communicates with the atmosphere. When the fifth selection valve 73*e* is opened, the coupling flow channel 52 communicates with the pressure sensor 49. When the sixth selection valve 73*f* and the seventh selection valve 73*g* are opened, the coupling flow channel 52 communicates with the atmosphere. When the eighth selection valve 73*h* is opened, the coupling flow channel 52 is opened. When the ninth selection valve 73*i* is opened, the narrow tube portion 72 communicates with the atmosphere. When the tenth selection valve 73*j* is opened, the atmosphere opening channel 50 is opened, and the first reservoir unit 33 communicates with the coupling flow channel 52. When the eleventh selection valve 73*k* is opened, the pressurizing flow channel 51 is opened, and the second reservoir unit 35 communicates with the coupling flow channel 52.

In order to change the pressure in the air chamber 53, the switching mechanism 48 opens the second selection valve 73*b* to the fourth selection valve 73*d* and closes the other selection valves. When the pressurizing unit 47 performs the normal rotation driving in this state, the air in the air chamber 53 is discharged through the air flow channel 55 and the coupling flow channel 52, and the pressure in the air chamber 53 is reduced. When the pressurizing unit 47 performs the inverse rotation driving in this state, the air is sent into the air chamber 53 through the coupling flow channel 52 and the air flow channel 55, and the pressure in the air chamber 53 is increased. In this process, the pressure sensor 49 may detect the pressures in the air flow channel 55 and the air chamber 53. The control unit 19 (see FIG. 1) may control the driving of the pressurizing unit 47 based on the detection result of the pressure sensor 49.

In order to open the first reservoir unit 33 to the atmosphere, the switching mechanism 48 opens the sixth selection valve 73*f* and the tenth selection valve 73*j*. The first reservoir chamber 62 communicates with the atmosphere through the atmosphere opening channel 50 and the coupling flow channel 52.

In order to open the second reservoir unit 35 to the atmosphere, the switching mechanism 48 opens the seventh selection valve 73*g* and the eleventh selection valve 73*k*. The second reservoir chamber 68 communicates with the atmosphere through the pressurizing flow channel 51 and the coupling flow channel 52.

In order to pressurize the inside of the second reservoir unit 35, the switching mechanism 48 opens the first selection valve 73*a*, the fifth selection valve 73*e*, the eighth selection valve 73*h*, and the eleventh selection valve 73*k* and closes the other selection valves. When the pressurizing unit 47 performs the normal rotation driving in this state, the air flows into the second reservoir chamber 68 through the air flow channel 55, the coupling flow channel 52, and the pressurizing flow channel 51, and the pressure in the second reservoir chamber 68 is increased. In this process, the pressure sensor 49 may detect the pressures in the coupling flow channel 52, the pressurizing flow channel 51, and the second reservoir chamber 68. The control unit 19 may control the driving of the pressurizing unit 47 based on the detection result of the pressure sensor 49.

F. Operations of Supply Unit

Operations when the liquid container 24 is mounted on the supply unit 25 are described.

As illustrated in FIG. 4, the liquid container 24 is inserted into the frame 80 from the insertion opening 28*o*. When the first reception unit 447*a* of the liquid container 24 is engaged with the first guiding unit 247*a* in the frame 80, the liquid container 24 is moved horizontally along the guiding route 82 along the Y axis by being guided by the first guiding unit 247*a*. In this process, the movement of the liquid container 24 in the width direction is limited by the two first guiding units 247*a* aligned in the width direction. In the middle of the guiding route, the upward movement of the liquid container 24 is limited by the frame 80, and the downward movement of the liquid container 24 is limited by the locking lever 92 (see FIG. 7).

When the liquid container 24 reaches near the termination end of the guiding route 82, the second reception unit 447*b* is engaged with the second guiding unit 247*b*. The electrical coupling unit 721 may be arranged between the first guiding unit 247*a* and the second guiding unit 247*b* in the vertical direction. In this case, the coupling terminal 521 is appropriately positioned in the vertical direction toward the electrical coupling unit 721. It is also possible to position the liquid container 24 in the width direction by the identification shape 630 arranged near the electrical coupling unit 721.

When the liquid container 24 reaches the termination end of the guiding route 82, the coupling terminal 521 is in contact with the electrical coupling unit 721. With this, it is possible to make data communication between the circuit substrate 150 and the control unit 19 (see FIG. 1). In this process, the second end wall 147 of the liquid container 24 is exposed to the outside of the frame 80 or in a position in which the second end wall 147 can be operated from outside the frame 80.

Subsequently, the operator pushes the liquid container 24 in the insertion direction against the pressing force of the fourth pressing member 274 while pushing a rear end (right end in FIG. 4) of the liquid container 24 downward. Then, the support member 90 pivots in the clockwise direction in FIG. 4 about the pivot shaft 91 against the pressing force of the first pressing member 83. In the process in which the liquid container 24 pivots, first, the positioning projection 248 enters the positioning hole 448 (see FIG. 2), and subsequently, the outlet 30 is coupled to the liquid inlet 60.

In this process, with the expansion and contraction of the press spring 780 (see FIG. 9), a slight displacement of the liquid container 24 along the Y axis is allowed while the coupling between the coupling terminal 521 and the electrical coupling unit 721 is maintained. Since the positioning projection 248 is arranged near the liquid inlet 60 and is inclined at the same angle as that of the liquid inlet 60, the outlet 30 is appropriately guided toward the liquid inlet 60.

In the process in which the support member 90 pivots to the coupling position, the liquid container 24 supported by the support member 90 is in contact with the first inclined surface 86 of the engagement lever 84. The upper end of the engagement lever 84 pushed by the liquid container 24 is displaced to be away from the pivoting route of the support member 90 to an outer side (right side in FIG. 5) against the pressing force of the second pressing member 85. When the protrusion of the engagement lever 84 is engaged with the engagement unit 497 of the liquid container 24, the support member 90 stays in the coupling position due to the pressing force of the second pressing member 85. With this, the mounting of the liquid container 24 is completed.

As illustrated in FIG. 6, once the mounting of the liquid container 24 is completed, the outlet 30 is coupled to the liquid inlet 60. Since the liquid container 24 is arranged above the liquid inlet 60, the liquid in the liquid container 24 is introduced into the first reservoir unit 33 through the liquid inlet 60 due to the hydraulic head difference.

Next, operations when the liquid container 24 is detached from the supply unit 25 are described.

When the liquid container 24 is detached from the mounting unit 28, the rear end (right end in FIG. 4) of the liquid container 24 is pulled upward against the pressing force of the second pressing member 85. In this process, since the engagement unit 497 is engaged with the second inclined surface 87, the support member 90 smoothly pivots with the liquid container 24. When the protrusion of the engagement lever 84 is detached from the engagement unit 497, the support member 90 pivots about the pivot shaft 91 from the coupling position to the guiding position due to the pressing force of the first pressing member 83.

In the process in which the support member 90 pivots from the coupling position to the guiding position, the outlet 30 moves away from the liquid inlet 60, and the positioning projection 248 comes out from the positioning hole 448. When the support member 90 reaches the guiding position, the liquid container 24 is pushed out toward the starting end of the guiding route due to the pressing force of the fourth pressing member 274. In this process, since the liquid container 24 is guided by the first guiding unit 247*a* and the second guiding unit 247*b*, the coupling terminal 521 immediately moves away from the electrical coupling unit 721 with no complication. At the same time, the release unit 241 moves away from the first arm 95, and the locking lever 92 pressed to the third pressing member 99 returns to the locking position.

Thereafter, when the operator pulls the liquid container 24 toward the outside of the frame 80, the liquid container 24 is guided to the first guiding unit 247*a*. In this process, since the pivoting of the support member 90 is limited by the locking lever 92, the liquid container 24 is moved horizontally along the Y axis with no contact with the liquid inlet 60.

G. Method of Controlling Liquid Ejection Apparatus

A method of controlling the liquid ejection apparatus 11 is described with reference to flowcharts in FIGS. 11 to 17. Here, it is possible to optionally replace the order of steps in each controlling method without departing from the object of the controlling method.

Figure 11:
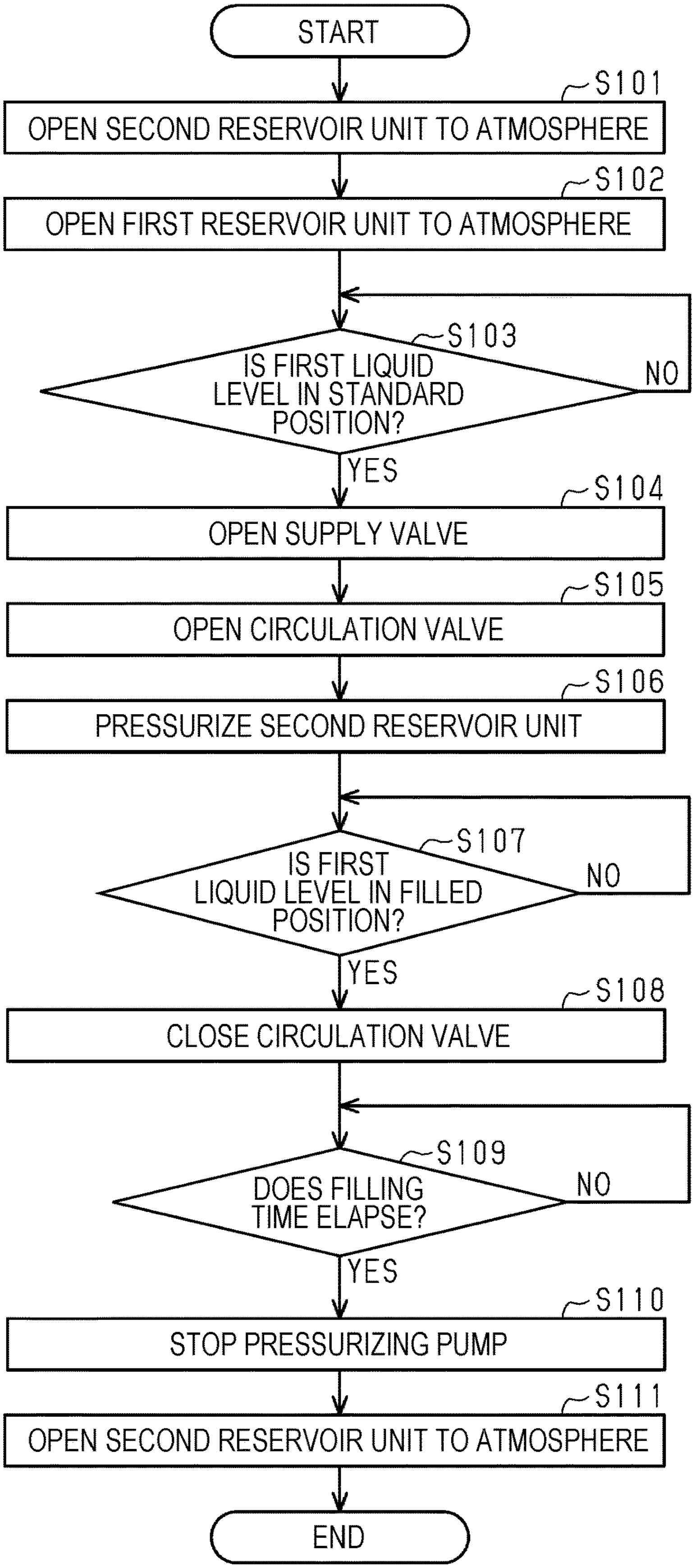
FIG. 11 is a flowchart indicating a liquid filling routine.

A liquid filling routine indicated in FIG. 11 may be executed in a timing in which the liquid container 24 is mounted on the mounting unit 28 first. The liquid filling routine may be executed in a timing in which the liquid container 24 is mounted on the mounting unit 28 after the liquid ejection head 23 is replaced. In the initial state, the supply valve 38, the circulation valve 40, and all the selection valves included in the switching mechanism 48 are closed.

In step S101, the control unit 19 opens the second reservoir unit 35 to the atmosphere. In step S102, the control unit 19 opens the first reservoir unit 33 to the atmosphere. In step S103, the control unit 19 determines whether the first liquid level 66 is positioned in the standard position. When the first liquid level 66 is not positioned in the standard position, step S103 is NO, and the control unit 19 waits until the first liquid level 66 is positioned in the standard position. When the first liquid level 66 is positioned in the standard position, step S103 is YES, and the control unit 19 proceeds the processing to step S104.

In step S104, the control unit 19 opens the supply valve 38. In step S105, the control unit 19 opens the circulation valve 40. In step S106, the control unit 19 pressurizes the inside of the second reservoir unit 35.

In step S107, the control unit 19 determines whether the first liquid level 66 is positioned in the filled position. When the first liquid level 66 is not positioned in the filled position, step S107 is NO, and the control unit 19 waits until the first liquid level 66 is positioned in the filled position. When the first liquid level 66 is positioned in the filled position, step S107 is YES, and the control unit 19 proceeds the processing to step S108.

In step S108, the control unit 19 closes the circulation valve 40. In step S109, the control unit 19 determines whether a filling time elapses after the circulation valve 40 is closed. The filling time is a time required for filling with the liquid from the supply flow channel 37 to the nozzles 22. When the filling time does not elapse, step S109 is NO, and the control unit 19 waits until the filling time elapses. When the filling time elapses, step S109 is YES, and the control unit 19 proceeds the processing to step S110. In step S110, the control unit 19 stops the driving of the pressurizing unit 47. In step S111, the control unit 19 opens the second reservoir unit 35 to the atmosphere and terminates the liquid filling routine.

In this case, each of steps S104 and S105 may be performed at the same time as or after step S106. Step S110 may be performed at the same time as or after step S111.

Next, operations when the liquid filling is performed are described.

When the liquid container 24 is mounted on the mounting unit 28, and the first reservoir unit 33 is opened to the atmosphere, the liquid is supplied from the liquid container 24 to the first reservoir unit 33. In this process, since the second reservoir unit 35 is also opened to the atmosphere, the liquid supplied to the first reservoir unit 33 flows into the second reservoir unit 35 as well. The first liquid level 66 and the second liquid level 70 are increased to the standard position.

When the liquid amount sensor 63 detects that the first liquid level 66 is positioned in the standard position, the control unit 19 opens the supply valve 38 and the circulation valve 40 and drives the pressurizing unit 47. When the pressure in the second reservoir unit 35 is higher than the pressure in the first reservoir unit 33, the one-way valve 36 is closed to close the communication channel 34. Therefore, the liquid in the second reservoir unit 35 flows into the first reservoir unit 33 through the supply flow channel 37, the liquid ejection head 23, and the collection flow channel 39.

When the liquid amount sensor 63 detects that the first liquid level 66 is positioned in the filled position, the control unit 19 closes the circulation valve 40. With this, the flow of the liquid into the first reservoir unit 33 is stopped. The liquid in the second reservoir unit 35 fills the inside of the liquid ejection head 23 and is discharged from the nozzles 22.

When the liquid ejection head 23 is filled with the liquid, the control unit 19 opens the second reservoir unit 35 to the atmosphere. With this, the one-way valve 36 is opened to open the communication channel 34. The liquid in the first reservoir unit 33 is supplied to the second reservoir unit 35 through the communication channel 34. The control unit 19 may close the supply valve 38.

Figure 12:
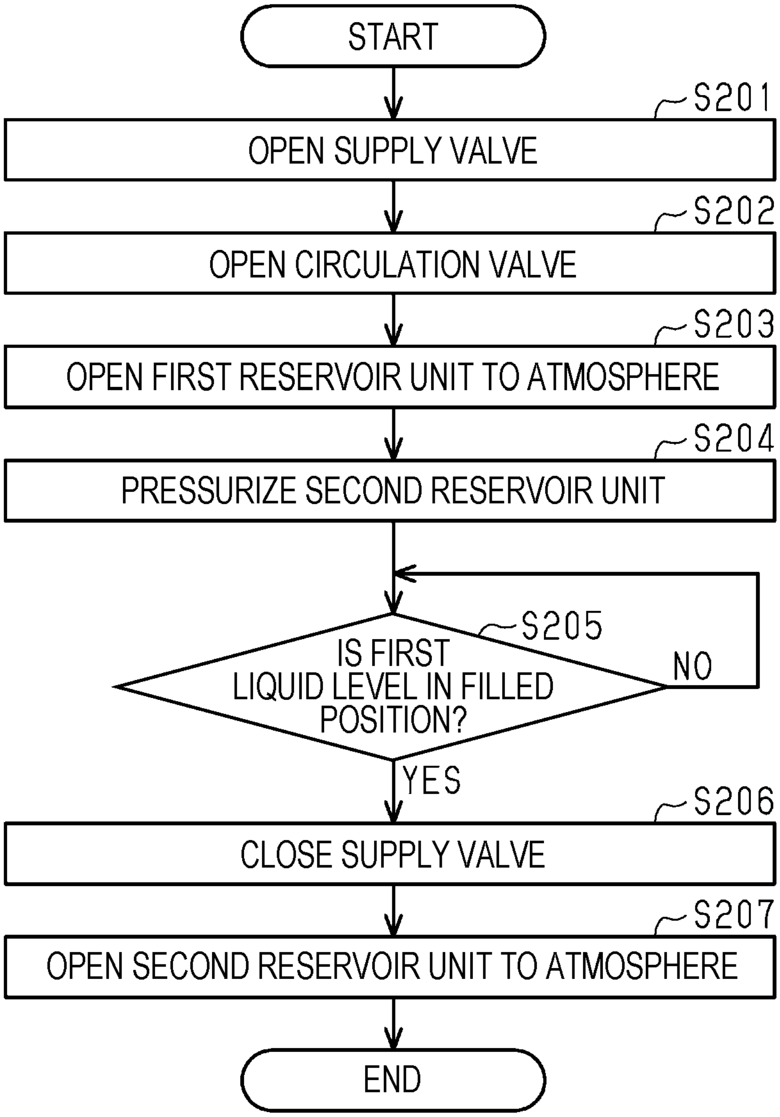
FIG. 12 is a flowchart indicating a liquid circulation routine.

A liquid circulation routine indicated in FIG. 12 may be executed in a timing in which the execution of the liquid circulation is instructed. The execution of the liquid circulation is instructed while waiting, which is after the liquid filling is executed and no printing and the like is performed, for example. The control unit 19 may execute the liquid circulation routine regularly.

In step S201, the control unit 19 opens the supply valve 38. In step S202, the control unit 19 opens the circulation valve 40. In step S203, the control unit 19 opens the first reservoir unit 33 to the atmosphere. In step S204, the control unit 19 pressurizes the inside of the second reservoir unit 35.

In step S205, the control unit 19 determines whether the first liquid level 66 is positioned in the filled position. When the first liquid level 66 is not positioned in the filled position, step S205 is NO, and the control unit 19 waits until the first liquid level 66 is positioned in the filled position. When the first liquid level 66 is positioned in the filled position, step S205 is YES, and the control unit 19 proceeds the processing to step S206. In step S206, the control unit 19 closes the supply valve 38. In step S207, the control unit 19 opens the second reservoir unit 35 to the atmosphere and terminates the liquid circulation routine.

In this case, each of steps S201 and S202 may be performed at the same time as or after step S203 or may be performed at the same time as or after step S204. Step S206 may be performed at the same time as or after step S207.

Next, operations when the liquid circulation is performed are described.

The control unit 19 opens the supply valve 38 to open the supply flow channel 37 by the supply valve 38. The control unit 19 opens the circulation valve 40 to open the collection flow channel 39 by the circulation valve 40.

With the pressurizing unit 47 pressurizing the inside of the second reservoir unit 35, the liquid ejection apparatus 11 flows and moves the liquid from the second reservoir unit 35 to the first reservoir unit 33 through the liquid ejection head 23. In this process, the pressure in the second reservoir unit 35 becomes higher than the pressure in the first reservoir unit 33. Therefore, the one-way valve 36 is closed. That is, the liquid ejection apparatus 11 closes the communication channel 34 by the one-way valve 36 by pressurizing the inside of the second reservoir unit 35.

Figure 13:
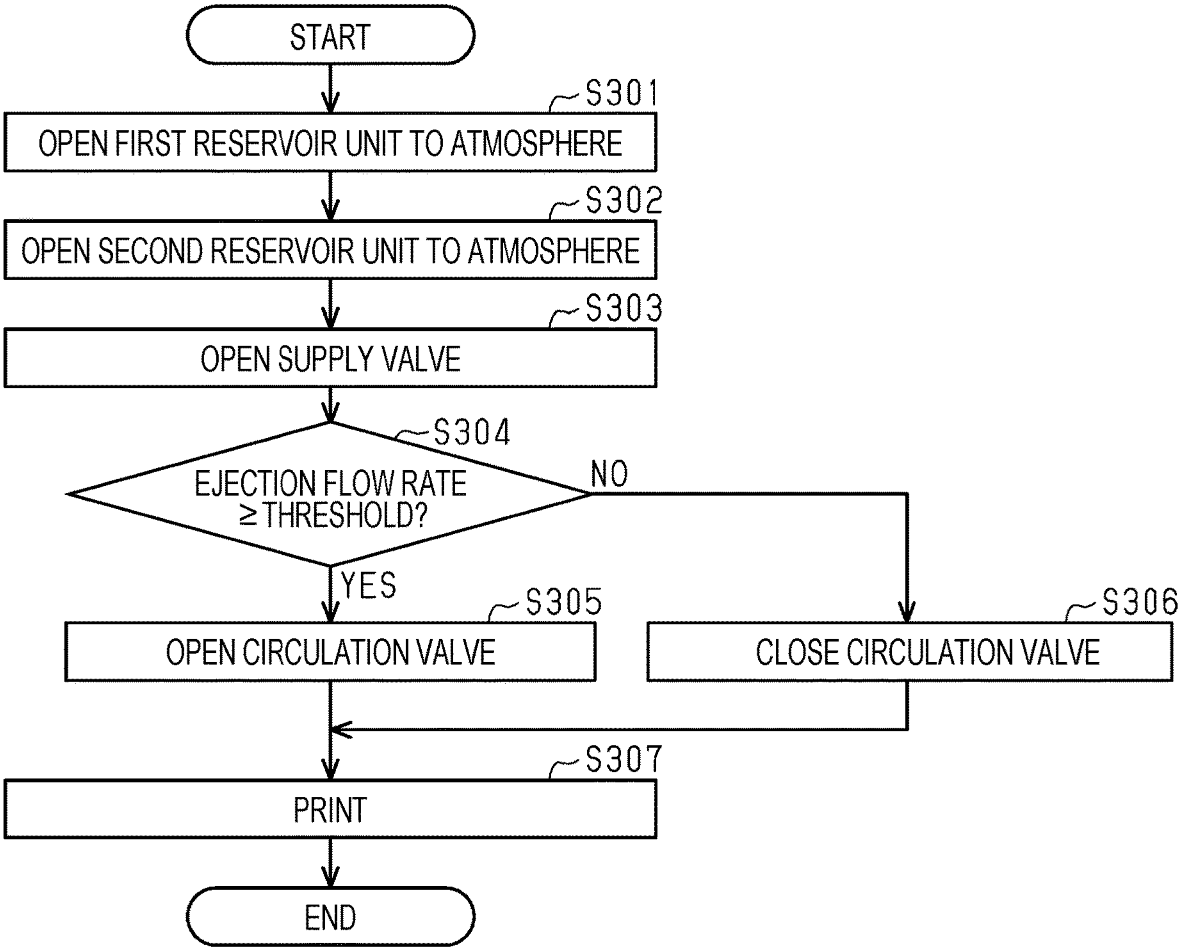
FIG. 13 is a flowchart indicating a printing routine.

A printing routine indicated in FIG. 13 may be executed in a timing in which the printing is instructed. In step S301, the control unit 19 opens the first reservoir unit 33 to the atmosphere. In step S302, the control unit 19 opens the second reservoir unit 35 to the atmosphere. In step S303, the control unit 19 opens the supply valve 38.

In step S304, the control unit 19 determines whether the ejection flow rate of the liquid generated by ejecting the liquid from the nozzles 22 during the printing is equal to or greater than a threshold. The control unit 19 may calculate the ejection flow rate from printing data. When the ejection flow rate is equal to or greater than the threshold, step S304 is YES, and the control unit 19 proceeds the processing to step S305. In step S305, the control unit 19 opens the circulation valve 40.

In step S304, when the ejection flow rate is smaller than the threshold, step S304 is NO, and the control unit 19 proceeds the processing to step S306. In step S306, the control unit 19 closes the circulation valve 40. In step S307, the control unit 19 executes the printing and terminates the printing routine.

In this case, each of steps S301 and S302 may be performed at the same time as or after step S303, may be performed at the same time as or after step S305, or may be performed at the same time as or after step S306.

Next, operations when the printing routine is executed are described.

When the ejection flow rate while the liquid ejection head 23 ejects the liquid onto the medium 12 is smaller than the threshold, the control unit 19 opens the supply valve 38 and closes the circulation valve 40. That is, the control unit 19 executes the printing while opening the supply flow channel 37 by the supply valve 38 and closing the collection flow channel 39 by the circulation valve 40. Therefore, the liquid is supplied to the liquid ejection head 23 from the second reservoir unit 35 through the supply flow channel 37.

When the ejection flow rate while the liquid ejection head 23 ejects the liquid onto the medium 12 is equal to or greater than the threshold, the control unit 19 opens the supply valve 38 and the circulation valve 40. That is, the control unit 19 executes the printing while opening the supply flow channel 37 by the supply valve 38 and opening the collection flow channel 39 by the circulation valve 40. Therefore, the liquid is supplied to the liquid ejection head 23 from the second reservoir unit 35 and the supply flow channel 37, and also the liquid is supplied thereto from the first reservoir unit 33 through the collection flow channel 39.

Figure 14:
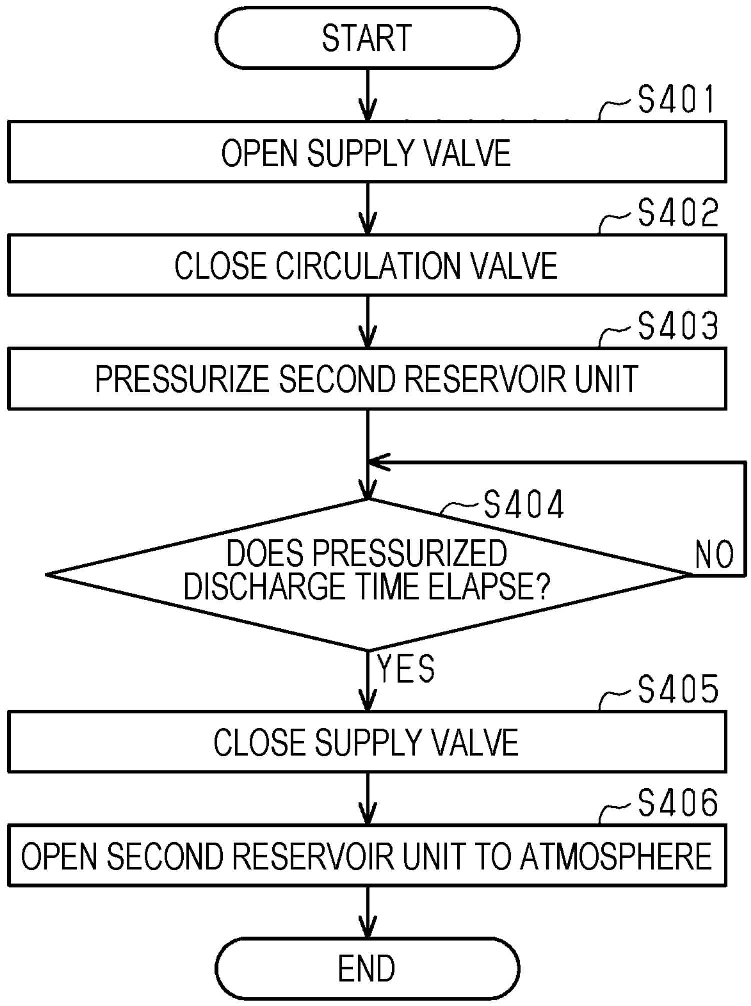
FIG. 14 is a flowchart indicating a pressurized discharge routine.

A pressurized discharge routine indicated in FIG. 14 is executed when the execution of the pressurized discharge is instructed or when an ejection failure that the nozzles 22 cannot normally eject the liquid, for example.

In step S401, the control unit 19 opens the supply valve 38. In step S402, the control unit 19 closes the circulation valve 40. In step S403, the control unit 19 pressurizes the inside of the second reservoir unit 35. In step S404, the control unit 19 determines whether a pressurized discharge time elapses after the inside of the second reservoir unit 35 is pressurized. The pressurized discharge time is a time required for the pressure that pressurizes the second reservoir unit 35 to be transmitted to the nozzles 22 through the supply flow channel 37 to cause the nozzles 22 to discharge the liquid and restore the state of the nozzles 22.

Until the pressurized discharge time elapses, step S404 is NO, and the control unit 19 waits until the pressurized discharge time elapses. When the pressurized discharge time elapses, step S404 is YES, and the control unit 19 proceeds the processing to step S405. In step S405, the control unit 19 opens the supply valve 38. In step S406, the control unit 19 opens the second reservoir unit 35 to the atmosphere and terminates the pressurized discharge routine.

In this case, each of steps S401 and S402 may be performed at the same time as or after step S403. Step S405 may be performed at the same time as or after step S406.

Next, operations when the pressurized discharge is performed are described.

The liquid ejection apparatus 11 pressurizes the inside of the second reservoir unit 35 by the pressurizing unit 47 and discharged the liquid from the nozzles 22. In this process, since the pressure in the second reservoir unit 35 is higher than the pressure in the first reservoir unit 33, the one-way valve 36 is closed. That is, the liquid ejection apparatus 11 closes the communication channel 34 by the one-way valve 36 by pressurizing the second reservoir unit 35.

When the pressurized discharge time elapses after the inside of the second reservoir unit 35 is pressurized, the control unit 19 closes the supply valve 38. With this, the discharging of the liquid from the nozzles 22 is stopped. When the second reservoir unit 35 is opened to the atmosphere, the one-way valve 36 is opened, and the liquid is supplied from the first reservoir unit 33 to the second reservoir unit 35.

Figure 15:
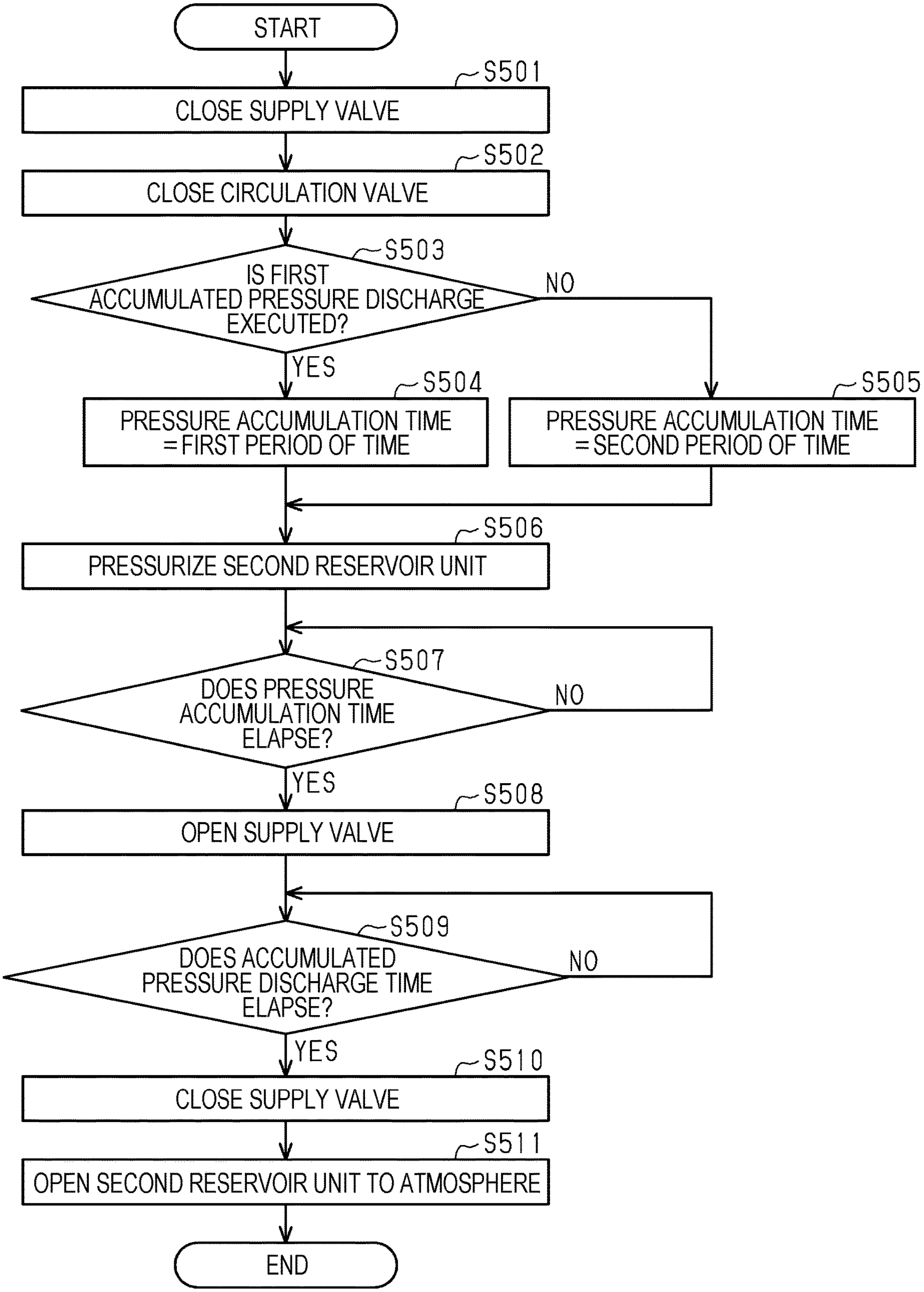
FIG. 15 is a flowchart indicating an accumulated pressure discharge routine.

An accumulated pressure discharge routine indicated in FIG. 15 may be executed when the execution of the accumulated pressure discharge is instructed or when the ejection failure is not corrected even by executing the pressurized discharge, for example.

In step S501, the control unit 19 closes the supply valve 38. In step S502, the control unit 19 closes the circulation valve 40. In step S503, the control unit 19 determines whether the execution of first accumulated pressure discharge of the accumulated pressure discharge is instructed or the execution of second accumulated pressure discharge thereof, which has an accumulated pressure smaller than that of the first accumulated pressure discharge, is instructed. When the first accumulated pressure discharge is executed, step S503 is YES, and the control unit 19 proceeds the processing to step S504. In step S504, the control unit 19 sets a pressure accumulation time to a first period of time.

In step S503, when the second accumulated pressure discharge is executed, step S503 is NO, and the control unit 19 proceeds the processing to step S505. In step S505, the control unit 19 sets the pressure accumulation time to a second period of time, which is shorter than the first period of time.

In step S506, the control unit 19 pressurizes the inside of the second reservoir unit 35. In step S507, the control unit 19 determines whether the pressure accumulation time elapses after the pressurizing of the inside of the second reservoir unit 35 is started. When the pressure accumulation time does not elapse yet, step S507 is NO, and the control unit 19 waits until the pressure accumulation time elapses. When the pressure accumulation time elapses, step S507 is YES, and the control unit 19 proceeds the processing to step S508.

In step S508, the control unit 19 opens the supply valve 38. In step S509, the control unit 19 determines whether an accumulated pressure discharge time elapses after the supply valve 38 is opened. The accumulated pressure discharge time is a time required for the pressure accumulated in the second reservoir unit 35 to be transmitted to the nozzles 22 through the supply flow channel 37 to cause the nozzles 22 to discharge the liquid.

Until the accumulated pressure discharge time elapses, step S509 is NO, and the control unit 19 waits until the accumulated pressure discharge time elapses. When the accumulated pressure discharge time elapses, step S509 is YES, and the control unit 19 proceeds the processing to step S510. In step S510, the control unit 19 closes the supply valve 38. In step S511, the control unit 19 opens the second reservoir unit 35 to the atmosphere and terminates the accumulated pressure discharge routine.

In this case, each of steps S501 and S502 may be performed at the same time as or immediately after the start of the pressurizing in step S506. Step S510 may be performed at the same time as or after step S511. Step S510 may not be performed.

Next, operations when the accumulated pressure discharge is performed are described.

The control unit 19 closes the supply valve 38 to close the supply flow channel 37 by the supply valve 38. The liquid ejection apparatus 11 pressurizes the inside of the second reservoir unit 35 by the pressurizing unit 47. In this process, since the pressure in the second reservoir unit 35 becomes higher than the pressure in the first reservoir unit 33, the one-way valve 36 is closed. That is, the liquid ejection apparatus 11 closes the communication channel 34 by the one-way valve 36 by pressurizing the second reservoir unit 35.

The liquid ejection apparatus 11 discharges the liquid from the nozzles 22 after the pressurizing unit 47 pressurizes the inside of the second reservoir unit 35 and the supply flow channel 37 is opened by the supply valve 38. The degree of the pressure accumulated in the second reservoir unit 35 is proportional to a time of pressurizing the inside of the second reservoir unit 35 while the communication channel 34 and the supply flow channel 37 are blocked. In the first accumulated pressure discharge, the time of pressurizing the inside of the second reservoir unit 35 by the pressurizing unit 47 is the first period of time. In the second accumulated pressure discharge, the time of pressurizing the inside of the second reservoir unit 35 by the pressurizing unit 47 is the second period of time, which is shorter than the first period of time. The pressure accumulated in the first accumulated pressure discharge is greater than the pressure accumulated in the second accumulated pressure discharge. That is, in the first accumulated pressure discharge, the supply flow channel 37 is opened by the supply valve 38 when the inside of the second reservoir unit 35 is pressurized by a first pressure. In the second accumulated pressure discharge, the supply flow channel 37 is opened by the supply valve 38 while the inside of the second reservoir unit 35 is pressurized by a second pressure lower than the first pressure.

When the accumulated pressure discharge time elapses after the inside of the second reservoir unit 35 is pressurized, the control unit 19 closes the supply valve 38. With this, the discharging of the liquid from the nozzles 22 is stopped. When the second reservoir unit 35 is opened to the atmosphere, the one-way valve 36 is opened, and the liquid is supplied from the first reservoir unit 33 to the second reservoir unit 35.

Figure 16:
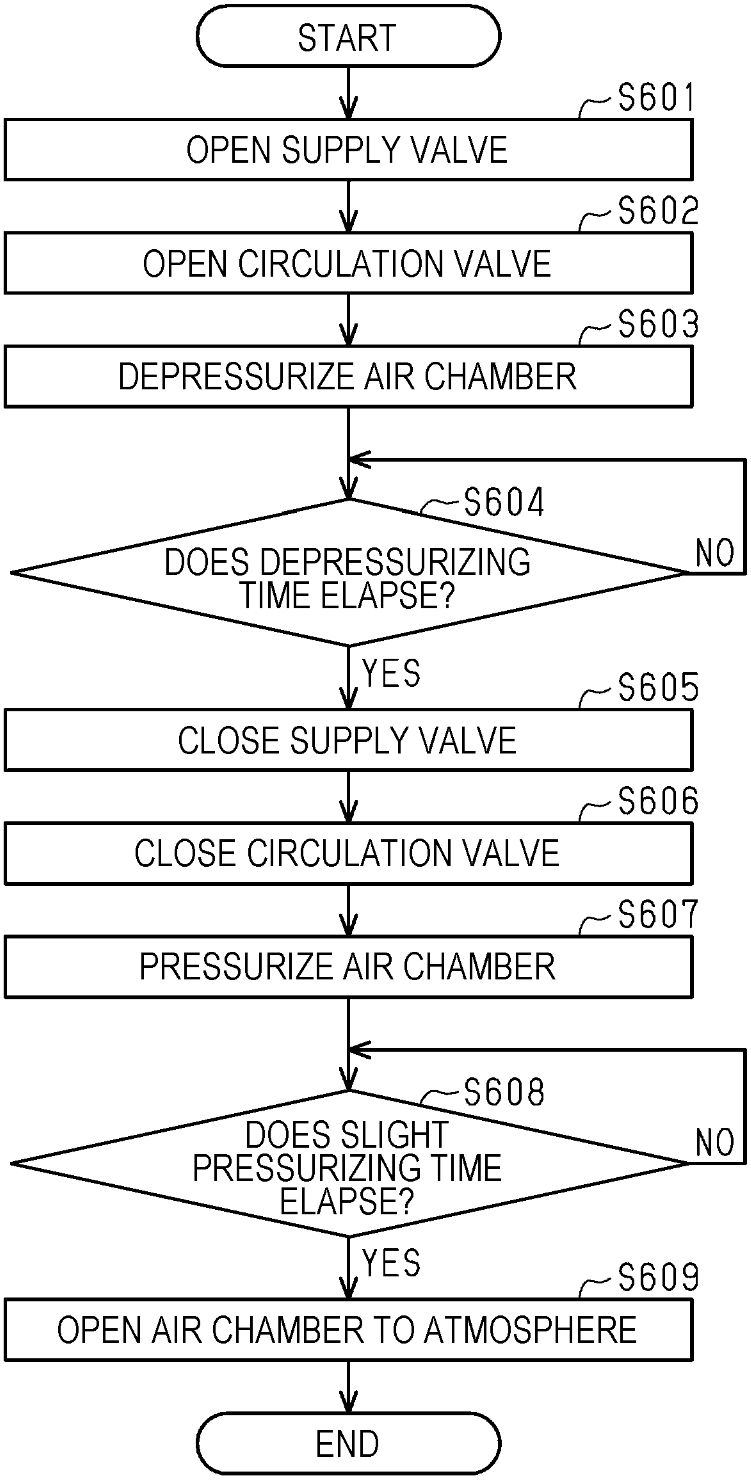
FIG. 16 is a flowchart indicating a slight pressurized discharge routine.

A slight pressurized discharge routine indicated in FIG. 16 may be executed when the execution of the slight pressurized discharge is instructed.

In step S601, the control unit 19 opens the supply valve 38. In step S602, the control unit 19 opens the circulation valve 40. In step S603, the control unit 19 depressurizes the air chamber 53. In step S604, the control unit 19 determines whether a depressurizing time elapses after the air chamber 53 is depressurized. The depressurizing time is a time required for deforming the flexible member 42 and increasing the volume of the liquid chamber 41 to the maximum.

Until the depressurizing time elapses, step S604 is NO, and the control unit 19 waits until the depressurizing time elapses. When the depressurizing time elapses, step S604 is YES, and the control unit 19 proceeds the processing to step S605. In step S605, the control unit 19 closes the supply valve 38. In step S606, the control unit 19 closes the circulation valve 40. In step S607, the control unit 19 pressurizes the air chamber 53.

In step S608, the control unit 19 determines whether a slight pressurizing time elapses after the air chamber 53 is pressurized. The slight pressurizing time is a time required for the pressure that pressurizes the air chamber 53 to be transmitted to the nozzles 22 through the liquid chamber 41 and the collection flow channel 39.

Until the slight pressurizing time elapses, step S608 is NO, and the control unit 19 waits until the slight pressurizing time elapses. When the slight pressurizing time elapses, step S608 is YES, and the control unit 19 proceeds the processing to step S609. In step S609, the control unit 19 opens the air chamber 53 to the atmosphere and terminates the slight pressurized discharge routine.

In this case, each of steps S601 and S602 may be performed at the same time as or after step S603. Each of steps S605 and S606 may be performed in the middle of step S603, at the same time as the termination of step S603, or after the termination of step S603. Each of steps S605 and S606 may be performed at the same time as or after step S607.

Next, operations when the slight pressurized discharge is performed are described.

The control unit 19 opens the supply flow channel 37 and the collection flow channel 39 by opening the supply valve 38 and the circulation valve 40. The control unit 19 depressurizes the air chamber 53 to deform the flexible member 42 and increase the volume of the liquid chamber 41. In the liquid chamber 41, the liquid flows therein from the first reservoir unit 33 through the collection flow channel 39, and the liquid flows therein from the second reservoir unit 35 through the supply flow channel 37 and the collection flow channel 39.

When the volume of the liquid chamber 41 is increased to the maximum, the control unit 19 closes the supply valve 38 to close the supply flow channel 37 by the supply valve 38. The control unit 19 closes the circulation valve 40 to close the collection flow channel 39 by the circulation valve 40. In this state, the liquid ejection apparatus 11 pressurizes the flexible member 42 by sending pressurized air to the air chamber 53 by the pressurizing unit 47. That is, the liquid ejection apparatus 11 discharges the liquid from the nozzles 22 by pressurizing the flexible member 42 by the pressurizing mechanism 57. The pressurizing mechanism 57 pressurizes the liquid chamber 41 by a pressure that breaks menisci formed in the nozzles 22. The amount of the liquid discharged from the liquid ejection head 23 by the slight pressurized discharge is smaller than the amount of the liquid discharged from the liquid ejection head 23 by the pressurized discharge.

Figure 17:
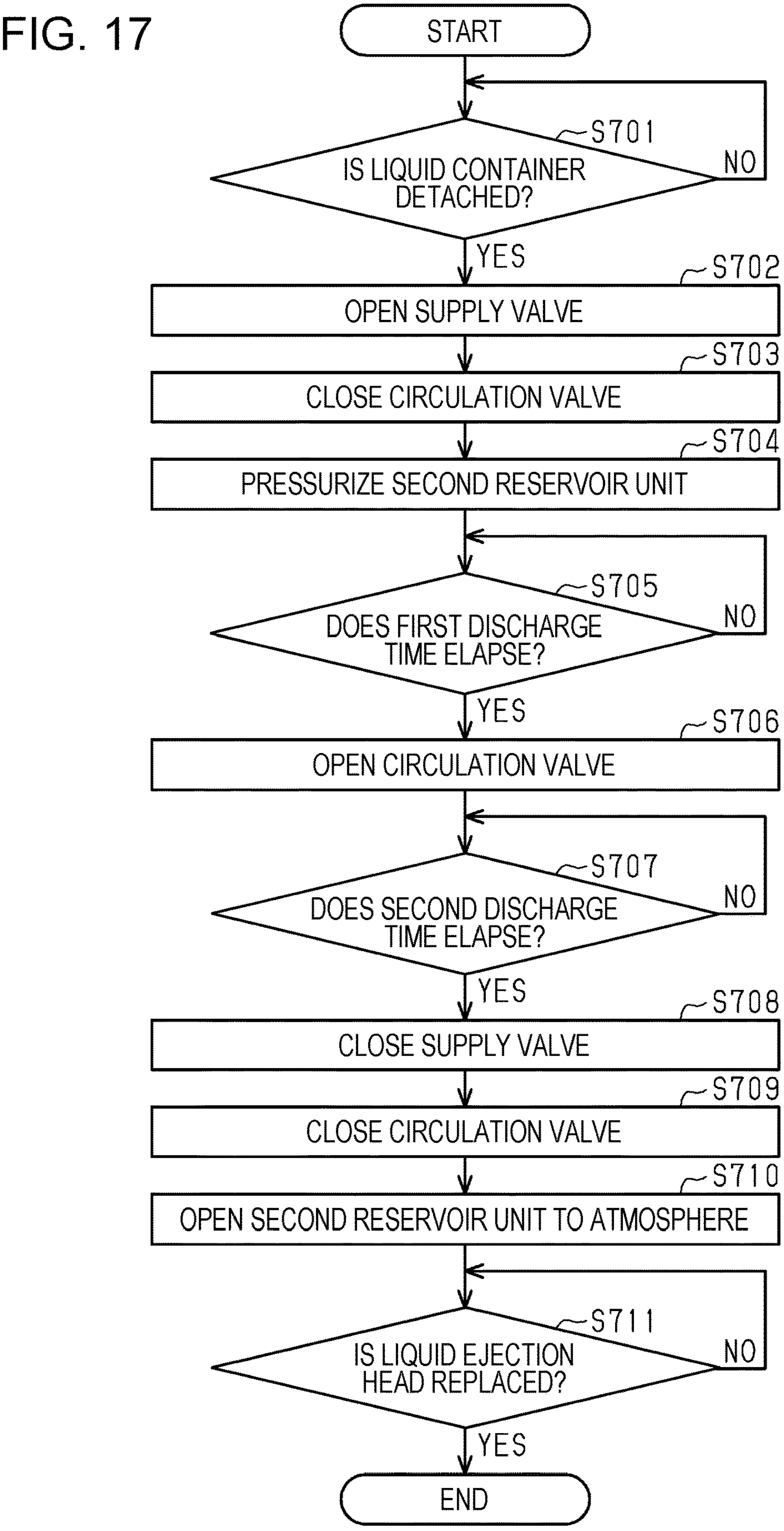
FIG. 17 is a flowchart indicating a head replacement routine.

A head replacement routine indicated in FIG. 17 may be executed when the liquid ejection head 23 is replaced.

In step S701, the control unit 19 determines whether the liquid container 24 is detached from the mounting unit 28. When the liquid container 24 is mounted on the mounting unit 28, step S701 is NO, and the control unit 19 waits until the liquid container 24 is detached. When the liquid container 24 is detached, step S701 is YES, and the control unit 19 proceeds the processing to step S702.

In step S702, the control unit 19 opens the supply valve 38. In step S703, the control unit 19 closes the circulation valve 40. In step S704, the control unit 19 pressurizes the inside of the second reservoir unit 35. In step S705, the control unit 19 determines whether a first discharge time elapses after the inside of the second reservoir unit 35 is pressurized. The first discharge time is a time required for the liquid accumulated in the second reservoir unit 35 to be discharged through the supply flow channel 37 and the liquid ejection head 23.

Until the first discharge time elapses, step S705 is NO, and the control unit 19 waits until the first discharge time elapses. When the first discharge time elapses, step S705 is YES, and the control unit 19 proceeds the processing to step S706. In step S706, the control unit 19 opens the circulation valve 40.

In step S707, the control unit 19 determines whether a second discharge time elapses after the circulation valve 40 is opened. The second discharge time is a time required for the liquid in the collection flow channel 39 to be collected in the first reservoir unit 33.

Until the second discharge time elapses, step S707 is NO, and the control unit 19 waits until the second discharge time elapses. When the second discharge time elapses, step S707 is YES, and the control unit 19 proceeds the processing to step S708. In step S708, the control unit 19 closes the supply valve 38. In step S709, the control unit 19 closes the circulation valve 40.

In step S710, the control unit 19 opens the second reservoir unit 35 to the atmosphere. In step S711, the control unit 19 determines whether the liquid ejection head 23 is replaced. When the liquid ejection head 23 is not replaced, step S711 is NO, and the control unit 19 waits until the liquid ejection head 23 is replaced. When the liquid ejection head 23 is replaced, step S711 is YES, and the control unit 19 terminates the head replacement routine.

In this case, each of steps S702 and S703 may be performed at the same time as or after the start of the pressurizing in step S704. Each of steps S708 and S709 may be performed at the same time as or after step S710.

Next, the head replacement routine is described.

When the liquid ejection head 23 is replaced, the operator executes the head replacement routine and detaches the liquid container 24 from the mounting unit 28. Subsequently, the control unit 19 opens the supply valve 38 to open the supply flow channel 37 by the supply valve 38. The control unit 19 closes the circulation valve 40 to close the collection flow channel 39 by the circulation valve 40. In this state, the control unit 19 pressurizes the inside of the second reservoir unit 35.

Specifically, the liquid ejection apparatus 11 pressurizes the inside of the second reservoir unit 35 by the pressurizing unit 47 and discharges the liquid from the second reservoir unit 35 to the liquid ejection head 23 from the nozzles 22. In this process, since the pressure in the second reservoir unit 35 is higher than the pressure in the first reservoir unit 33, the one-way valve 36 is closed. That is, the liquid ejection apparatus 11 closes the communication channel 34 by the one-way valve 36 by pressurizing the second reservoir unit 35.

When the liquid in the second reservoir unit 35, the supply flow channel 37, and the liquid ejection head 23 is discharged, the control unit 19 opens the circulation valve 40 to open the collection flow channel 39 by the circulation valve 40. That is, the liquid ejection apparatus 11 pressurizes the inside of the second reservoir unit 35 by the pressurizing unit 47 and collects the liquid in the collection flow channel 39 into the first reservoir unit 33. The operator replaces the liquid ejection head 23 while there is no liquid in the supply flow channel 37, the liquid ejection head 23, and the collection flow channel 39.

Next, operations of the liquid ejection apparatus 11 and a control method thereof are described.

The communication channel 34 communicating with the first reservoir unit 33 and the supply flow channel 37 communicating with the liquid ejection head 23 are coupled to the second reservoir unit 35. The communication channel 34 can be closed by the one-way valve 36 when the pressurizing unit 47 pressurizes the inside of the second reservoir unit 35. Thus, the liquid in the pressurized second reservoir unit 35 is supplied to the liquid ejection head 23 through the supply flow channel 37. Consequently, the liquid ejection apparatus 11 can discharge the liquid from the nozzles 22 by pressurizing the liquid in the liquid ejection head 23. Therefore, nozzle missing, or an ejection failure, which occurs because the liquid ejection head 23 sucks the liquid from the nozzles 22, does not occur easily.

When the pressurizing unit 47 pressurizes the inside of the second reservoir unit 35 while the one-way valve 36 closes the communication channel 34, and the supply valve 38 closes the supply flow channel 37, pressurized force is accumulated in the second reservoir unit 35. Therefore, it is possible to transmit a high pressure to the liquid ejection head 23 by opening the supply valve 38 while the pressure inside the second reservoir unit 35 is increased, and it is possible to facilitate the discharging of a thickened liquid and the like, for example.

When the pressurizing unit 47 pressurizes the inside of the second reservoir unit 35 while the circulation valve 40 closes the collection flow channel 39, the liquid is discharged from the liquid ejection head 23. When the pressurizing unit 47 pressurizes the inside of the second reservoir unit 35 while the circulation valve 40 opens the collection flow channel 39, the liquid in the liquid ejection head 23 is collected into the first reservoir unit 33 through the collection flow channel 39. Consequently, it is possible to selectively perform maintenance depending on a state of air bubbles in the supply flow channel 37, a state of the nozzles 22, and the like, for example.

When the pressurizing mechanism 57 pressurizes the liquid chamber 41 while the circulation valve 40 closes the collection flow channel 39, the liquid is discharged from the liquid ejection head 23. The amount of the discharged liquid in this process is determined depending on the size of the liquid chamber 41. Therefore, comparing with the case of pressurizing the inside of the second reservoir unit 35 by the pressurizing unit 47, it is possible to apply more accurately the slight pressurizing of a degree that breaks the menisci formed in the nozzles 22 to the liquid ejection head 23.

The pressurizing mechanism 57 includes the pressurizing unit 47 pressurizing the inside of the second reservoir unit 35. The pressurizing unit 47 presses the flexible member 42 by pressurizing the air chamber 53 through the air flow channel 55 and pressurizes the liquid chamber 41. Therefore, it is possible to pressurize the liquid in the second reservoir unit 35 and the liquid in the liquid chamber 41 by the pressurizing unit 47.

The first coupling unit 44 to which the collection flow channel 39 is coupled is arranged in a position higher than that of the second coupling unit 45 to which the supply flow channel 37 is coupled. Since air bubbles in the liquid ejection head 23 are likely to be gathered in a high position due to the buoyance, the air bubbles are more likely to be gathered in the first coupling unit 44 than in the second coupling unit 45. Therefore, it is possible to easily discharge the air bubbles from the liquid ejection head 23 by collecting the liquid in the liquid ejection head 23 into the first reservoir unit 33 through the collection flow channel 39.

For example, when the communication channel 34 is closed by driving the one-way valve 36, a driving source to drive the one-way valve 36 is required. In this regard, the one-way valve 36 includes a check valve. Specifically, the one-way valve 36 allows the flow of the liquid supplied from the first reservoir unit 33 to the second reservoir unit 35 due to the hydraulic head difference but limits the flow of the liquid from the second reservoir unit 35 to the first reservoir unit 33 when the inside of the second reservoir unit 35 is pressurized. Therefore, the one-way valve 36 is not required to be driven, and the driving source can be omitted.

In the liquid ejection head 23, the nozzle surface 21 is inclined with respect to the horizontal. Therefore, it is possible to improve a degree of freedom of the arrangement of the liquid ejection head 23.

In the pressurized discharge, the communication channel 34 is closed by the one-way valve 36, and the inside of the second reservoir unit 35 is pressurized by the pressurizing unit 47. The liquid in the pressurized second reservoir unit 35 is supplied to the liquid ejection head 23 through supply flow channel 37. Consequently, the liquid ejection apparatus 11 can discharge the liquid from the nozzles 22 by pressurizing the liquid in the liquid ejection head 23 and can reduce the risk that the liquid ejection head 23 sucks the liquid from the nozzles 22.

In the accumulated pressure discharge, pressurized force is accumulated in the second reservoir unit 35 with the pressurizing unit 47 pressurizing the inside of the second reservoir unit 35 while the one-way valve 36 closes the communication channel 34, and the supply valve 38 closes the supply flow channel 37. In the accumulated pressure discharge, since the supply valve 38 is opened after the inside of the second reservoir unit 35 is pressurized, it is possible to transmit the accumulated high pressure to the liquid ejection head 23 and to facilitate the discharging of a thickened liquid and the like, for example.

In the first accumulated pressure discharge, the liquid is discharged from the nozzles 22 with the supply valve 38 opening the supply flow channel 37 when the inside of the second reservoir unit 35 is pressurized by the first pressure. In the second accumulated pressure discharge, the liquid is discharged from the nozzles 22 with the supply valve 38 opening the supply flow channel 37 when the inside of the second reservoir unit 35 is pressurized by the second pressure lower than the first pressure. Therefore, it is possible to efficiently fill the supply flow channel 37 with the liquid by performing the first accumulated pressure discharge and the second accumulated pressure discharge in combination depending on the configuration of the supply flow channel 37, for example.

In the driving of the pressurizing unit 47 while the communication channel 34 and the supply flow channel 37 are closed, a pressure that can be accumulated becomes higher as the driving time is longer. In this regard, in the first accumulated pressure discharge, the liquid is discharged from the nozzles 22 with the supply valve 38 opening the supply flow channel 37 after the inside of the second reservoir unit 35 is pressurized for the first period of time. In the second accumulated pressure discharge, the liquid is discharged from the nozzles 22 with the supply valve 38 opening the supply flow channel 37 after the inside of the second reservoir unit 35 is pressurized for the second period of time shorter than the first period of time. Therefore, it is possible to efficiently fill the supply flow channel 37 with the liquid by performing the first accumulated pressure discharge and the second accumulated pressure discharge in combination depending on the configuration of the supply flow channel 37, for example.

When the liquid circulation is performed, the liquid is collected from the second reservoir unit 35 into the first reservoir unit 33 through the supply flow channel 37, the liquid ejection head 23, and the collection flow channel 39. Air bubbles in the supply flow channel 37 and the liquid ejection head 23 move with the liquid. Therefore, it is possible to collect the air bubbles without discharging the liquid from the liquid ejection head 23.

In the slight pressurized discharge, the liquid is discharged from the liquid ejection head 23 by pressurizing the liquid in the liquid chamber 41 with the pressurizing mechanism 57 pressurizing the flexible member 42 while the supply valve 38 closes the supply flow channel 37, and the circulation valve 40 closes the collection flow channel 39. The amount of the discharged liquid in this process is determined depending on the size of the liquid chamber 41. Therefore, comparing with the case of pressurizing the inside of the second reservoir unit 35 by the pressurizing unit 47, it is possible to apply more accurately the slight pressurizing of a degree that breaks the menisci formed in the nozzles 22 to the liquid ejection head 23.

In the slight pressurized discharge, the pressurizing unit 47 pressurizes the air chamber 53 through the air flow channel 55 to pressurize the flexible member 42. Therefore, it is possible to pressurize the liquid in the second reservoir unit 35 and the liquid in the liquid chamber 41 by the pressurizing unit 47.

In the head replacement routine, the liquid in the second reservoir unit 35, the supply flow channel 37, and the liquid ejection head 23 is discharged from the nozzles 22 by pressurizing the inside of the second reservoir unit 35 while the communication channel 34 and the collection flow channel 39 are closed, and the supply flow channel 37 is opened. Thereafter, the liquid in the collection flow channel 39 is collected into the first reservoir unit 33 by pressurizing the inside of the second reservoir unit 35 while the communication channel 34 is closed, and the collection flow channel 39 and the supply flow channel 37 are opened. Consequently, since the replacement of the liquid ejection head 23 is performed while the liquid is discharged from the supply flow channel 37, the liquid ejection head 23, and the collection flow channel 39, it is possible to inhibit liquid leaking from the supply flow channel 37, the liquid ejection head 23, and the collection flow channel 39.

When the ejection flow rate when the liquid is ejected onto the medium 12 is equal to or greater than the threshold, the supply flow channel 37 and the collection flow channel 39 are opened. Since the liquid is supplied to the liquid ejection head 23 not only from the supply flow channel 37 but also from the collection flow channel 39, it is possible to easily supply a required amount of the liquid.

H. Other Embodiments

This embodiment can be implemented with the following changes. This embodiment and the following modifications can be implemented in combination with each other without technical contradiction.

- The liquid ejection apparatus 11 may include a wiping member (not-illustrated) that wipes the nozzle surface 21. The liquid ejection apparatus 11 may wipe the nozzle surface 21 by the wiping member after the liquid is discharged from the nozzles 22. The liquid ejection apparatus 11 may allow the operator to wipe the nozzle surface 21 before the operator detaches the liquid ejection head 23.
- The control unit 19 may control opening and closing of the one-way valve 36. The control unit 19 may block the communication channel 34 by the one-way valve 36 before pressurizing the inside of the second reservoir unit 35.
- The second accumulated pressure discharge may be performed by, first, setting the pressure inside the second reservoir unit 35 to the first pressure by pressurizing the inside of the second reservoir unit 35 for the first period of time while the one-way valve 36 and the supply valve 38 are closed, reducing the pressure in the second reservoir unit 35 to the second pressure by opening the one-way valve 36, and then opening the supply valve 38.

In the slight pressurized discharge, the liquid in the liquid chamber 41 may be pressurized by pressing the flexible member 42 by the spring 54. In this case, the control unit 19 increases the volume of the liquid chamber 41 by depressurizing the air chamber 53 and thereafter opens the air chamber 53 to the atmosphere. When the air chamber 53 reaches the atmospheric pressure, the spring 54 pushes the liquid in the liquid chamber 41 to discharge the liquid from the liquid ejection head 23. When the configuration is to press the flexible member 42 by the spring 54, the spring 54 is included in the pressurizing mechanism 57.

The liquid ejection apparatus 11 may execute the printing while the collection flow channel 39 is opened by the circulation valve 40 regardless of the ejection flow rate.

The liquid ejection head 23 may include multiple pressure chambers communicating with the multiple nozzles 22, respectively, a common liquid chamber with which the multiple pressure chambers communicate, and a filter chamber storing the filter. The first coupling unit 44 and the second coupling unit 45 are coupled to at least one of the pressure chambers, the common liquid chamber, and the filter chamber. For example, when the first coupling unit 44 and the second coupling unit 45 are coupled to the filter chamber, the liquid ejection apparatus 11 can collect air bubbles captured by the filter into the first reservoir unit 33 with the liquid by performing the liquid circulation. The liquid ejection apparatus 11 may perform the liquid circulation when air bubbles are generated in the liquid ejection head 23.

When the liquid ejection apparatus 11 is waiting or powered off, the supply valve 38 and the circulation valve 40 may be closed to close the supply flow channel 37 and the collection flow channel 39. With the supply flow channel 37 and the collection flow channel 39 being closed, it is possible to reduce the risk of liquid leaking from the liquid ejection head 23 even when a vibration or impact is applied to the liquid ejection apparatus 11, for example.

The amount of the liquid that the second reservoir unit 35 can accumulate may be smaller than the amount of the liquid required for the pressurized discharge. In this case, the control unit 19 may alternately execute the supplying of the liquid from the second reservoir unit 35 to the liquid ejection head 23 by pressurizing the inside of the second reservoir unit 35 and the supplying of the liquid from the first reservoir unit 33 to the second reservoir unit 35 by opening the second reservoir unit 35 to the atmosphere.

The liquid amount sensor 63 may detect that the first liquid level 66 is positioned in an end position below the standard position. When the liquid amount sensor 63 detects that the first liquid level 66 is positioned in the end position, the control unit 19 may notify that the first reservoir unit 33 is empty. The end position may be set such that the total amount of the liquid accumulated in the first reservoir unit 33 and the second reservoir unit 35 when the first liquid level 66 and the second liquid level 70 are positioned in the end position is greater than the amount of the liquid required for the printing of a single medium 12; therefore, it is possible to complete the printing on a single medium 12.

The amount of the liquid stored in the liquid container 24 may be smaller than the amount of the liquid that the supply unit 25 can hold. In this case, the liquid container 24 may be replaced in the middle of the liquid filling in which the supply unit 25 is filled with the liquid.

In the accumulated pressure discharge, first, the inside of the second reservoir unit 35 may be pressurized while the communication channel 34 is closed by the one-way valve 36, and the supply flow channel 37 is closed by the supply valve 38, and thereafter, when the pressure sensor 49 detects that the pressure reaches a predetermined pressure, the supply flow channel 37 may be opened by the supply valve 38. In this process, the control unit 19 may perform the first accumulated pressure discharge in which the supply flow channel 37 is opened when the pressure sensor 49 detects that the pressure reaches the first pressure and the second accumulated pressure discharge in which the supply flow channel 37 is opened when the pressure sensor 49 detects that the pressure reaches the second pressure smaller than the first pressure. The first pressure and the second pressure are greater than the pressurized force to pressurize the second reservoir unit 35 during the pressurized discharge.

The control unit 19 may depressurize the inside of the first reservoir unit 33 when the liquid flows from the collection flow channel 39 into the first reservoir unit 33. For example, the atmosphere opening channel 50 may be coupled to the air flow channel 55. With the pressurizing unit 47 performing the normal rotation driving, the inside of the second reservoir unit 35 may be pressurized, and also the inside of the first reservoir unit 33 may be depressurized through the air flow channel 55 and the atmosphere opening channel 50.

The control unit 19 may depressurize the inside of the first reservoir unit 33 to expand air bubbles included in the liquid accumulated in the first reservoir unit 33 so as to remove the air bubbles from the liquid.

The liquid filling, the pressurized discharge, the slight pressurized discharge, and the liquid circulation may be performed multiple times or performed in combination. When the amount of the liquid that can be accumulated in the first reservoir unit 33 is smaller than the amount of the liquid filled in the supply flow channel 37, the collection flow channel 39, and the liquid ejection head 23, the supply flow channel 37, the collection flow channel 39, and the liquid ejection head 23 may be filled with the liquid by performing the liquid filling multiple times. For example, the slight pressurized discharge may be performed after the liquid filling. With the liquid filling and the slight pressurized discharge being in combination, it is possible to reduce the occurrence of ejection failure more than a case of performing only the liquid filling.

The first reservoir unit 33 and the second reservoir unit 35 may be integrally formed with each other.

The flexible member 42 may be formed of a rubber film, an elastomer film, a film, or the like.

The liquid chamber 41 may be provided in the supply flow channel 37. The pressurizing mechanism 57 may pressurize a liquid chamber provided in the supply flow channel 37.

The pressurizing unit 47 may use a diaphragm pump, piston pump, a gear pump, or the like.

The liquid inlet 60 and the outlet 30 may include multiple flow channels. For example, one flow channel may allow the liquid to flow from the liquid container 24 into the first reservoir unit 33, while the other flow channel may allow the air to flow from the first reservoir unit 33 into the liquid container 24.

The liquid ejection head 23 may perform the printing on the medium 12 by ejecting the liquid in a horizontal orientation in which the nozzle surface 21 is horizontal. The liquid ejection head 23 may be provided such that the orientation of the liquid ejection head 23 can be changed between the horizontal orientation and the inclined orientation.

The liquid ejection apparatus 11 may include an atmosphere opening channel that opens the second reservoir unit 35 to the atmosphere in addition to the pressurizing flow channel 51.

In the head replacement routine indicated in FIG. 17, the control unit 19 may execute steps S702 to S705 again after executing step S710. With this, it is possible to discharge the liquid collected in the first reservoir unit 33 from the liquid ejection head 23.

The liquid ejection apparatus 11 may be a liquid ejection apparatus that sprays or ejects a different liquid other than the ink. The state of the liquid ejected from the liquid ejection apparatus as a minute amount of liquid droplet includes particle state, tear state, and stringy state. The liquid in this case may be any material as long as it can be ejected from the liquid ejection apparatus. For example, the liquid may be anything as long as the matter has a liquid phase, which includes a fluid body, such as a liquid with high or low viscosity, sol, gel water, another inorganic solvent, organic solvent, solution, liquid resin, liquid metal, metallic melt, and the like. The liquid includes not only a liquid as one state of the matter but also a liquid in which particles of functional materials formed of solids, such as colorant and metallic particles are melted, dispersed, or mixed in a solvent. Representative examples of the liquid may be an ink as described in the above embodiment, a liquid crystal, and the like. In this case, the ink is assumed to include various liquid compositions, such as a general water-based ink and oil-based ink, a gel ink, and a hot-melt ink. Specific examples of the liquid ejection apparatus may be an apparatus ejecting a liquid including a dispersed or melted material, such as an electrode material and color material used for manufacturing and the like of a liquid crystal display, an electroluminescence display, a surface-emitting display, and a color filter, for example. The liquid ejection apparatus may be an apparatus ejecting a living organic material used for biochip manufacturing, an apparatus used as a precision pipette and ejecting a liquid as a specimen, a textile printing apparatus, a micro dispenser, or the like. The liquid ejection apparatus may be an apparatus ejecting a lubricant oil onto a precise machine, such as a clock or a camera with a projection point, or an apparatus ejecting a transparent resin liquid, such as ultraviolet-curing resin onto a substrate to form a minute hemispherical lens, an optical lens, and the like used in an optical communication element and the like. The liquid ejection apparatus may be an apparatus ejecting an etching liquid of acid or alkaline for etching a substrate and the like.

I. Effects of Present Disclosure

Technical aspects and effects thereof of the present disclosure comprehended from the above-described embodiments and modifications are described below.

(1) A supply unit, to which at least one liquid container storing a liquid is configured to be attached and detached, includes: a support member that extends along a guiding route crossing a vertical line and that includes a distal region in which a starting end of the guiding route is positioned and a proximal region in which a termination end of the guiding route is positioned; a pivot shaft that is arranged in the proximal region and that has an axis crossing both the vertical line and guiding route; and a liquid inlet that is arranged below the support member and that is configured to be coupled to the liquid container, in which the support member is configured to pivot about the pivot shaft between a guiding position in which the at least one liquid container is guided along the guiding route and a coupling position in which each of the at least one liquid container is coupled to the liquid inlet.

With this configuration, it is possible to couple the liquid container to the liquid inlet by horizontally inserting the liquid container from the front of the supply unit and thereafter pivoting the liquid container downward with the support member. Thus, easy handling is achieved since it is possible to attach and detach the liquid container from the front of the supply unit.

(2) In the above-described supply unit, the support member may include at least one guiding unit guiding the liquid container.

With this configuration, easy handling is achieved since it is possible to guide the movement of the liquid container by the guiding unit.

(3) The above-described supply unit may further include: a first pressing member pressing the support member from the coupling position toward the guiding position.

With this configuration, it is possible to pivot the support member toward the guiding position by pressing force of the first pressing member.

(4) The above-described supply unit may further include: an engagement lever arranged to be engaged with the liquid container supported by the support member when the support member is in the coupling position; and a second pressing member pressing the engagement lever toward the support member.

With this configuration, it is possible to hold the liquid container in the coupling position by the second pressing member pressing the engagement lever to be engaged with the liquid container.

(5) In the above-described supply unit, the engagement lever includes an inclined surface engaged with the liquid container supported by the support member when the support member pivots from the coupling position toward the guiding position.

With this configuration, it is possible to smoothly move the liquid container along the inclined surface when the support member pivots from the coupling position toward the guiding position.

(6) The above-described supply unit further includes: a locking lever configured to be displaced between a locking position in which pivoting of the support member is limited and a releasing position in which the pivoting of the support member is permitted, in which the locking lever is configured to be displaced from the locking position to the releasing position by being engaged with the liquid container when the liquid container reaches the termination end of the guiding route.

With this configuration, the pivoting of the support member is limited by the locking lever even when the liquid container in the middle of the guiding route pushes the support member. Therefore, it is possible to inhibit the liquid container during mounting from colliding with the liquid inlet.

(7) In the above-described supply unit, the liquid container may include a circuit substrate, the circuit substrate may include a coupling terminal and a storage medium storing information on the liquid container, and the support member may include an electrical coupling unit configured to be electrically coupled to the coupling terminal in the proximal region.

With this configuration, it is possible to obtain the information stored in the storage medium through the electrical coupling unit.

(8) The above-described supply unit further includes an extrusion mechanism configured to press the liquid container supported by the support member toward the starting end.

With this configuration, it is possible to appropriately separate the coupling terminal from the electrical coupling unit by pushing the liquid container with pressing force of the extrusion mechanism when the support member is in the guiding position.

(9) In the above-described supply unit, the liquid inlet may be arranged in an orientation inclined with respect to the guiding route.

With this configuration, it is possible to smoothly couple the pivoting liquid container to the liquid inlet.

(10) The above-described supply unit further includes: a reservoir unit that is arranged below the support member and that is configured to accumulate the liquid supplied from the liquid container; and an atmosphere opening channel that is arranged above the reservoir unit and that is configured to open an inside of the reservoir unit to an atmosphere.

With this configuration, since the liquid container is arranged above the reservoir unit, it is possible to cause the liquid in the liquid container to flow and move into the reservoir unit due to a hydraulic head difference.

(11) In the above-described supply unit, the reservoir unit is a first reservoir unit, and the supply unit further includes: a second reservoir unit that communicates with the first reservoir unit and that is configured to receive the liquid flowing from the first reservoir unit; and a one-way valve that is provided between the first reservoir unit and the second reservoir unit and that is configured to permit a flow of the liquid from the first reservoir unit to the second reservoir unit and limit a flow of the liquid from the second reservoir unit to the first reservoir unit.

With this configuration, it is possible to replace the liquid container while the liquid is supplied from the second reservoir unit. With this, there is no need to stop supplying of the liquid even during replacement of the liquid container.

(12) A liquid ejection apparatus includes: the above-described supply unit; a liquid ejection head ejecting the liquid; and a supply flow channel supplying the liquid from the supply unit to the liquid ejection head.

With this configuration, it is possible to couple the liquid container to the liquid inlet by horizontally inserting the liquid container from the front of the liquid ejection apparatus and thereafter pivoting the liquid container downward with the support member. Thus, easy handling is achieved since it is possible to attach and detach the liquid container from the front of the liquid ejection apparatus.

(13) The liquid ejection apparatus may further include: a pressurizing mechanism configured to pressurize the liquid in the supply flow channel.

With this configuration, it is possible to perform pressurizing cleaning in which the liquid is discharged from the liquid ejection head by the pressurizing mechanism pressurizing the liquid.

(14) The liquid ejection apparatus may further include: a collection flow channel for flowing the liquid in the liquid ejection head toward the supply unit.

With this configuration, it is possible to circulate the liquid between the liquid ejection head and the supply unit.

What is claimed is:

1. A supply unit to which at least one liquid container storing a liquid is configured to be attached and detached, the supply unit comprising:

a support member configured to support a bottom of the liquid container, extending along a guiding route crossing a vertical line and including a distal region in which a starting end of the guiding route is positioned and a proximal region in which a termination end of the guiding route is positioned;

a pivot shaft that is arranged in the proximal region and that has an axis crossing both the vertical line and guiding route; and a liquid inlet that is arranged below the support member and that is configured to be coupled to the liquid container, wherein the support member is configured to pivot about the pivot shaft between a guiding position in which the at least one liquid container is guided along the guiding route and a coupling position in which the at least one liquid container is coupled to the liquid inlet.

2. The supply unit according to claim 1, wherein the support member includes at least one guiding unit guiding the liquid container.

3. The supply unit according to claim 1, further comprising:

a first pressing member pressing the support member from the coupling position toward the guiding position.

4. The supply unit according to claim 1, further comprising:

an engagement lever arranged to be engaged with the liquid container supported by the support member when the support member is in the coupling position; and a second pressing member pressing the engagement lever toward the support member.

5. The supply unit according to claim 4, wherein the engagement lever includes an inclined surface engaged with the liquid container supported by the support member when the support member pivots from the coupling position toward the guiding position.

6. The supply unit according to claim 1, further comprising:

a locking lever configured to be displaced between a locking position in which pivoting of the support member is limited and a releasing position in which the pivoting of the support member is permitted, wherein the locking lever is configured to be displaced from the locking position to the releasing position by being engaged with the liquid container when the liquid container reaches the termination end of the guiding route.

7. The supply unit according to claim 1, wherein the liquid container includes a circuit substrate, the circuit substrate includes a coupling terminal and a storage medium storing information on the liquid container, and the support member includes an electrical coupling unit configured to be electrically coupled to the coupling terminal in the proximal region.

8. The supply unit according to claim 1, further comprising:

an extrusion mechanism configured to press the liquid container supported by the support member toward the starting end.

9. The supply unit according to claim 1, wherein the liquid inlet is arranged in an orientation inclined with respect to the guiding route.

10. The supply unit according to claim 1, further comprising:

a reservoir unit that is arranged below the support member and that is configured to accumulate the liquid supplied from the liquid container; and an atmosphere opening channel that is arranged above the reservoir unit and that is configured to open an inside of the reservoir unit to an atmosphere.

11. The supply unit according to claim 10, wherein the reservoir unit is a first reservoir unit, and the supply unit further comprises:

a second reservoir unit that communicates with the first reservoir unit and that is configured to receive the liquid flowing from the first reservoir unit; and a one-way valve that is provided between the first reservoir unit and the second reservoir unit and that is configured to permit a flow of the liquid from the first reservoir unit to the second reservoir unit and limit a flow of the liquid from the second reservoir unit to the first reservoir unit.

12. A liquid ejection apparatus, comprising:

the supply unit according to claim 1;

a liquid ejection head ejecting a liquid; and a supply flow channel supplying the liquid from the supply unit to the liquid ejection head.

13. The liquid ejection apparatus according to claim 12, further comprising:

a pressurizing mechanism configured to pressurize the liquid in the supply flow channel.

14. The liquid ejection apparatus according to claim 12, further comprising:

a collection flow channel for flowing the liquid in the liquid ejection head toward the supply unit.

15. The supply unit according to claim 1, wherein the support member is configured to pivot between the guiding position and the coupling position while supporting the bottom of the liquid container.

16. The supply unit according to claim 1, wherein the guiding route extends horizontally.

17. A supply unit to which at least one liquid container storing a liquid is configured to be attached and detached, the supply unit comprising:

a support member that extends along a guiding route crossing a vertical line and that includes a distal region in which a starting end of the guiding route is positioned and a proximal region in which a termination end of the guiding route is positioned;

a pivot shaft that is arranged in the proximal region and that has an axis crossing both the vertical line and guiding route;

a locking lever configured to be displaced between a locking position in which pivoting of the support member is limited and a releasing position in which the pivoting of the support member is permitted; and a liquid inlet that is arranged below the support member and that is configured to be coupled to the liquid container, wherein the support member is configured to pivot about the pivot shaft between a guiding position in which the at least one liquid container is guided along the guiding route and a coupling position in which the at least one liquid container is coupled to the liquid inlet, and the locking lever is configured to be displaced from the locking position to the releasing position by being engaged with the liquid container when the liquid container reaches the termination end of the guiding route.

* * * * *